United States Patent [19]

Piasecki et al.

[11] Patent Number: 4,747,096
[45] Date of Patent: May 24, 1988

[54] COMBINATION TASI AND ADPCM APPARATUS

[75] Inventors: Joshua Piasecki, Ramat-Gan; Silvain Schaffer, Ramat Hasharon; Aharon Segev, Kiron; Jacob Ben-Zeev, Jerusalem; Teodor Henquin, Kiron, all of Israel

[73] Assignee: ECI Telecom Limited, Tel Aviv, Israel

[21] Appl. No.: 853,412

[22] Filed: Apr. 17, 1986

[30] Foreign Application Priority Data

Apr. 17, 1985 [IL] Israel .................................. 74965

[51] Int. Cl.$^4$ .............................................. H04J 3/17
[52] U.S. Cl. .................................... 370/81; 370/110.1
[58] Field of Search ................... 370/56, 80, 81, 110.1

[56] References Cited

U.S. PATENT DOCUMENTS 4,506,359  3/1985  Henquin et al. ................. 370/110.1
4,523,309  6/1985  Piasecki et al. ....................... 370/81

FOREIGN PATENT DOCUMENTS 0025465  3/1981  European Pat. Off. ............. 370/81
0049428  4/1982  European Pat. Off. ............. 370/81

OTHER PUBLICATIONS

"Performance of an ADPCM/TASI System", by Townes et al, ICC '80, 1980 Internation Conference on Communications, Seattle, WA, USA, Jun. 8–12, 1980, pp. 42.6.1–42.6.5.
"The Design of an ADPCM/TASI System for PCM Speech Compression", by Agrawal et al, IEEE Transactions on Communications, vol.-Com-29, No. 9, Sep. 1981, pp. 1393–1398.
"DCM Systems to Expand TAT-8 Circuit Capacity", J. Piasetsky and R. Murphy, Telephony, Aug. 4, 1986.

Primary Examiner—Douglas W. Olms
Assistant Examiner—Melvin Marcelo
Attorney, Agent, or Firm—Browdy and Neimark

[57] ABSTRACT

A digital circuit multiplication system for interconnecting a transmission trunk link having a plurality of bearer channels to a second plurality of telephone communication trunks, with the second plurality exceeding the first. The system comprises transmission apparatus at a first end of the transmission link within which there is apparatus for detecting signals on the second plurality of telephone communication trunks and apparatus for assigning each trunk on which signals are present to an available one of the first plurality of bearer channels and for providing assignment messages indicating such assignments. The speech signals are transmitted in bit reduced form by adaptive differential pulse code modulation (ADPCM) transmitting apparatus which is operative to be coupled to the first plurality of bearer channels. The output of the ADPCM transmitting apparatus is combined with the assignment messages along the first plurality of bearer channels, and the assignment messages are stripped from the speech signals at the other end of the transmission link by a signal receiving and message detection apparatus. A receiving apparatus operates to assign each of the first plurality of bearer channels carrying signals to a corresponding one of the second plurality of trunks in accordance with the assignment information received from the transmission apparatus. The signal receiving and detection apparatus contains delay circuitry for temporarily storing the received signals and detecting whether there are assignment messages contained in them, whereupon if these are detected, a message extractor apparatus replaces them with output signals constituting a predetermined signal pattern.

18 Claims, 16 Drawing Sheets

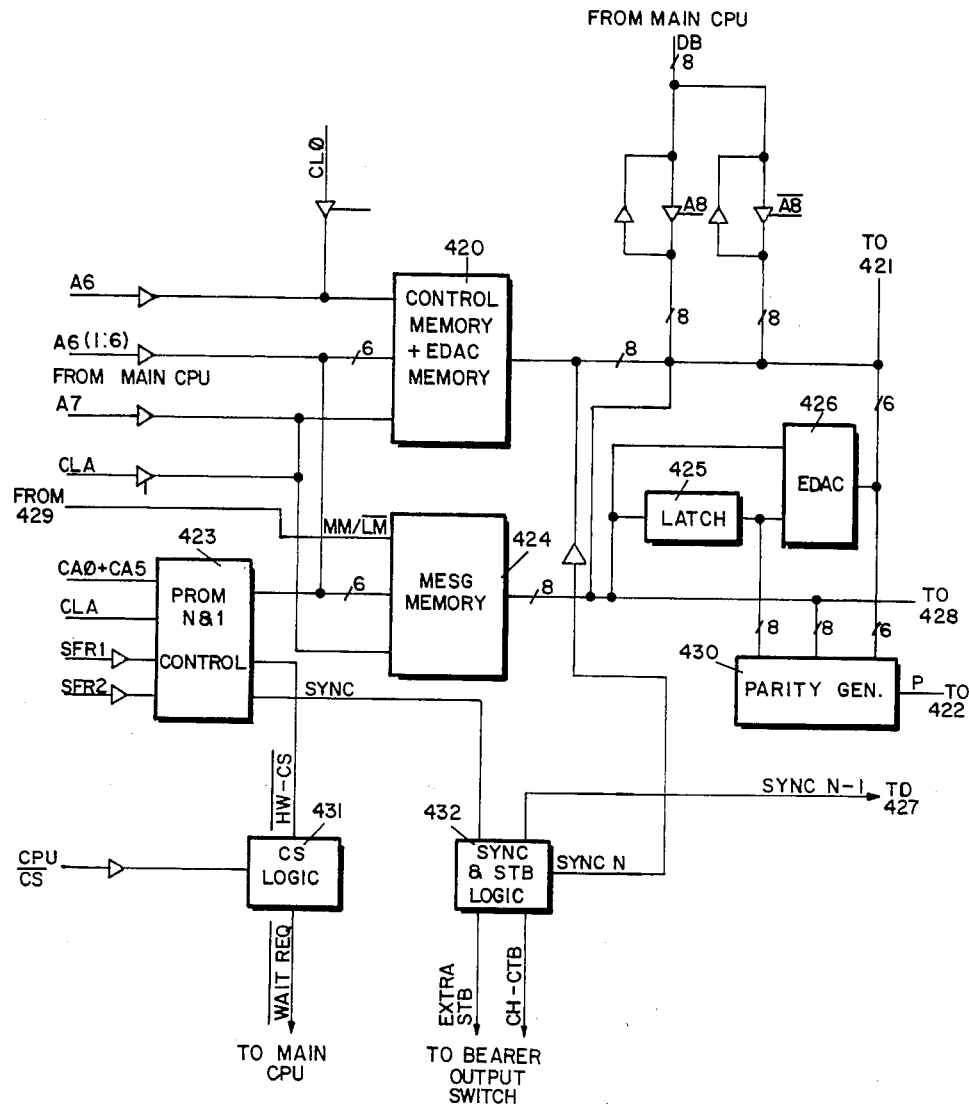
FIG. 13a DCC — MTX

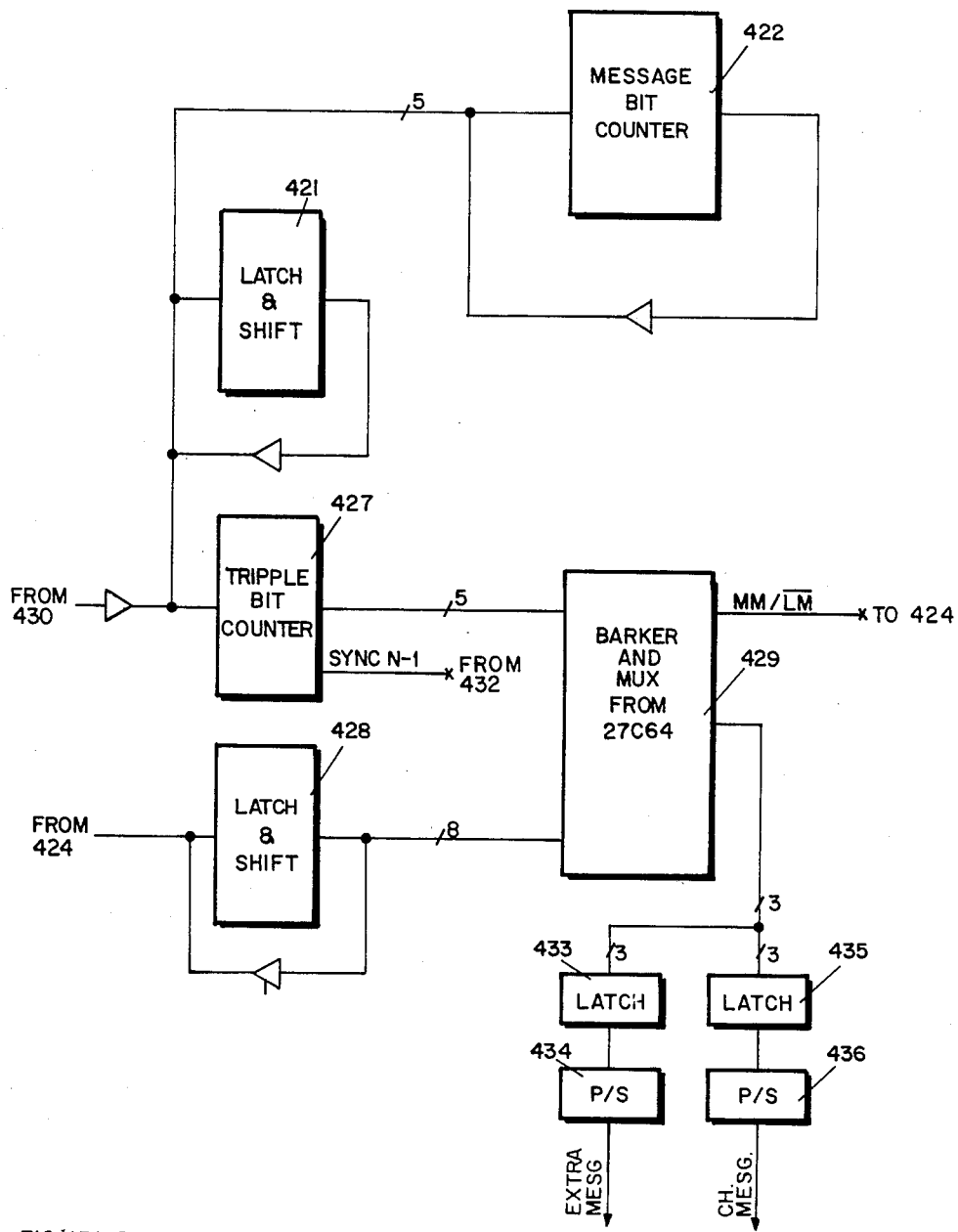
FIG. 13b DCC-MTX

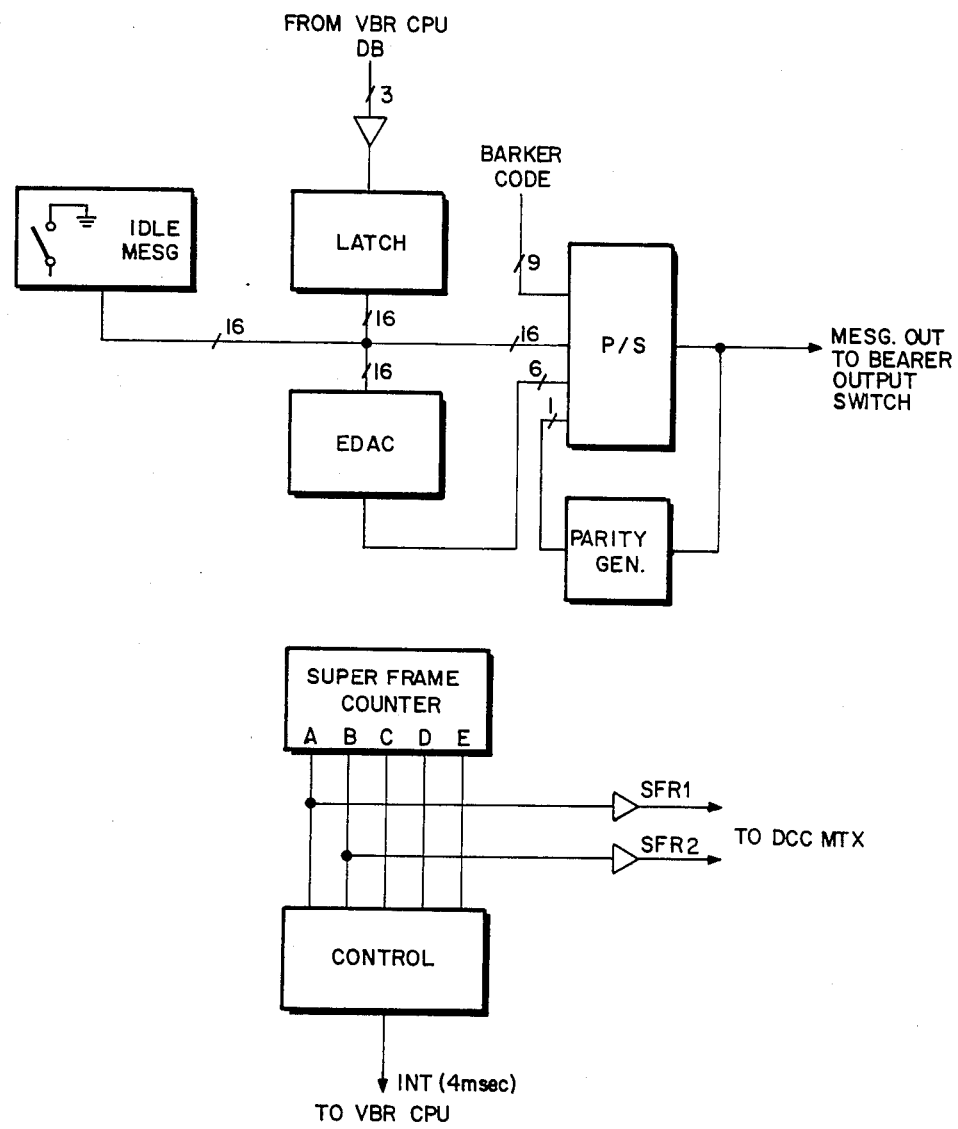
FIG. 14 VCC-MTX

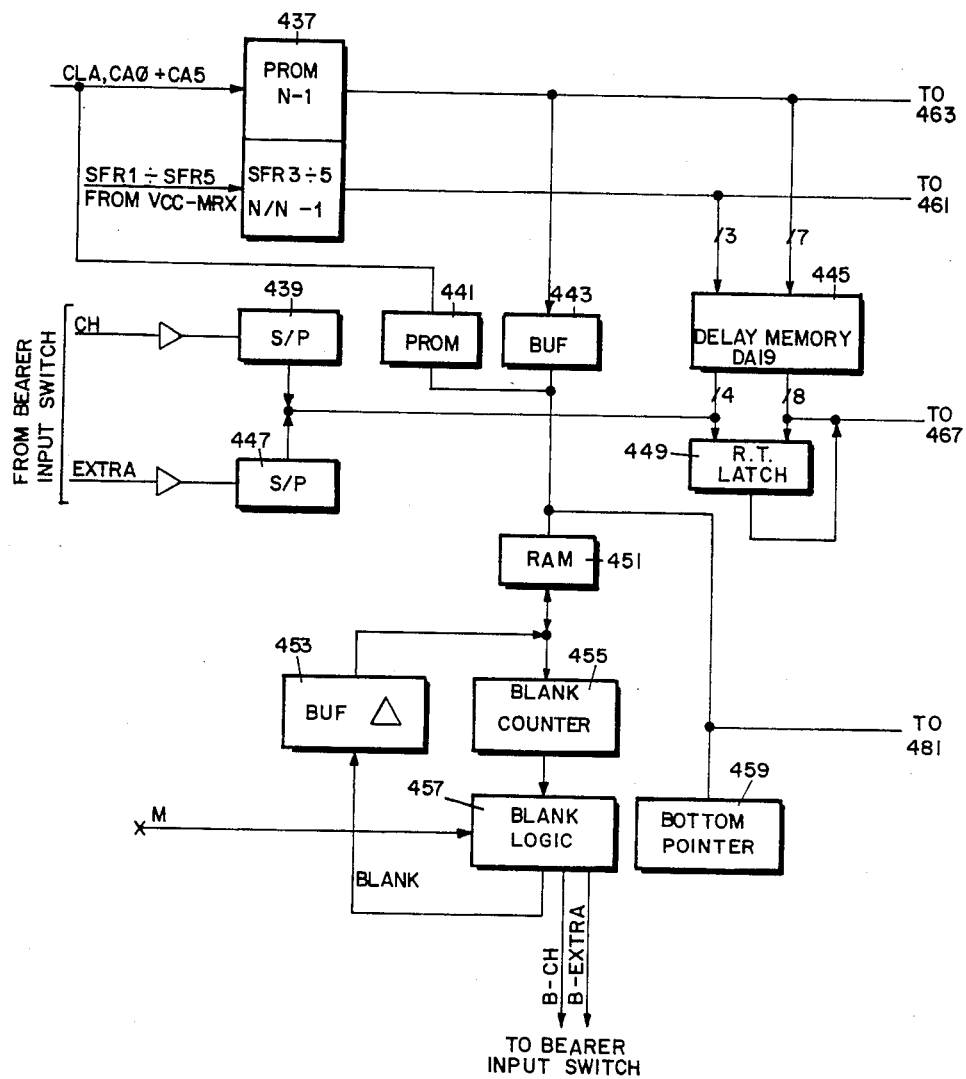
FIG. 15a DLC-MRX

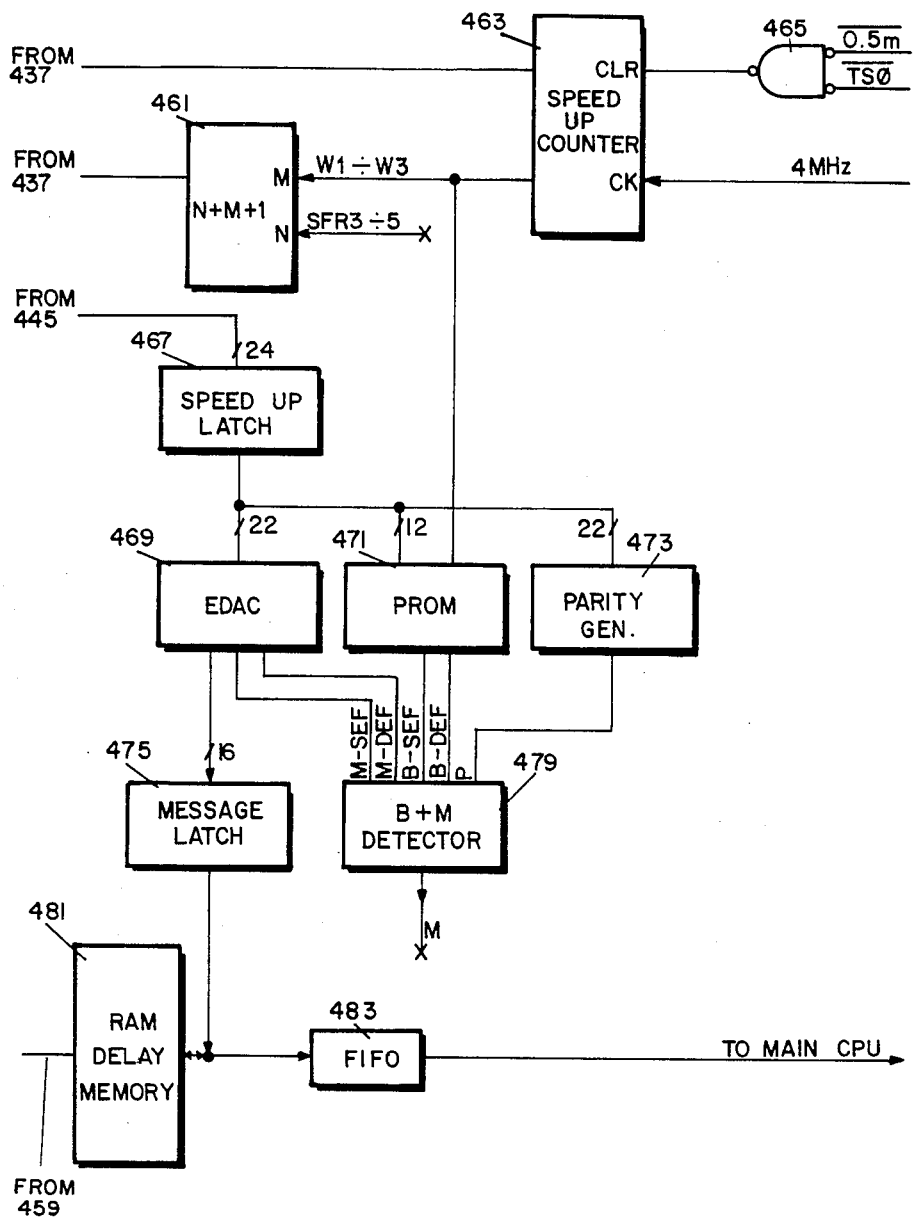
FIG. 15b DLC—MRX

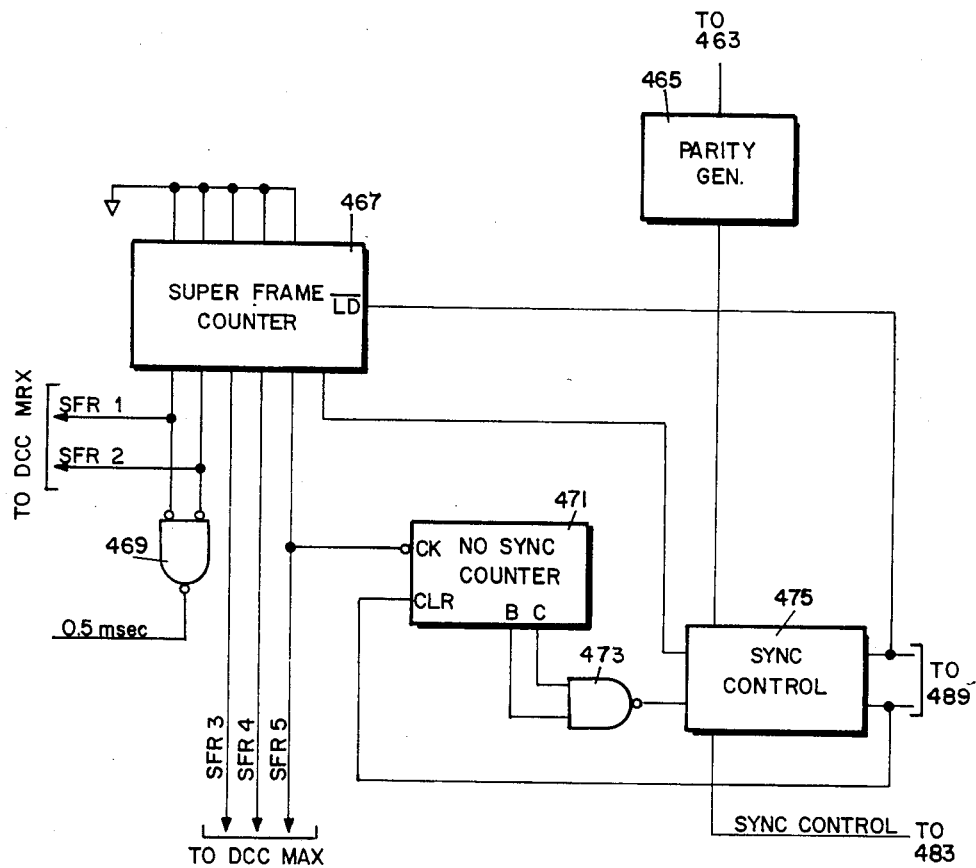
FIG. 16a VCC — MRX

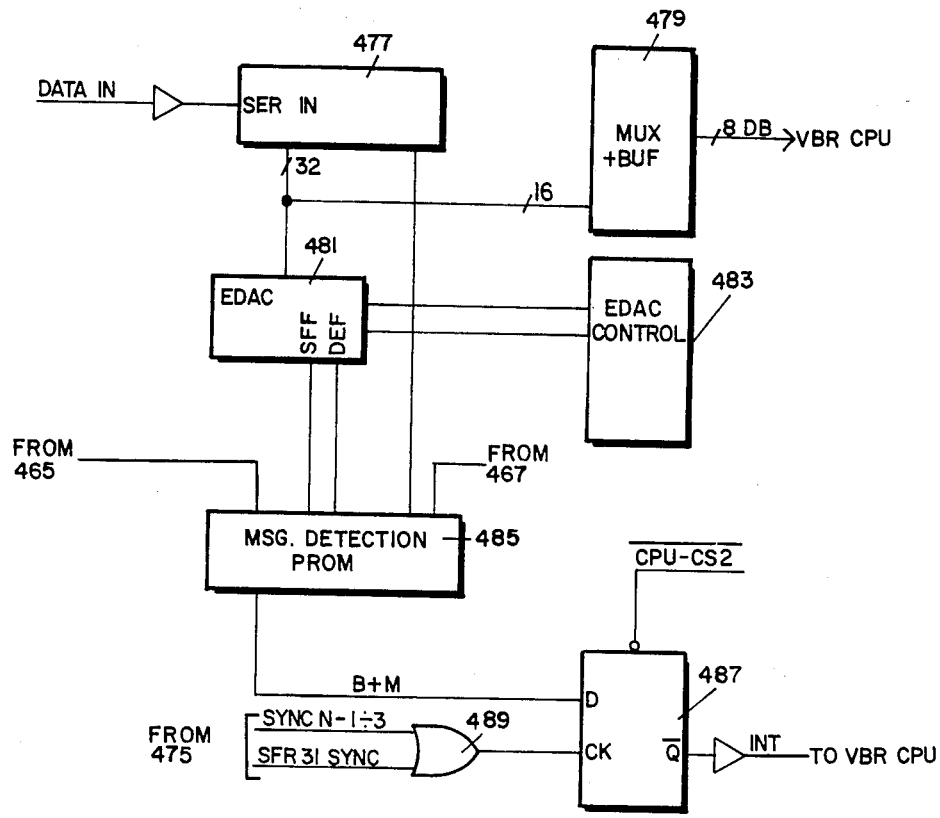
FIG. 16b VCC-MRX

COMBINATION TASI AND ADPCM APPARATUS

FIELD OF THE INVENTION

The present invention relates to communications apparatus generally and more particularly to circuit multiplication apparatus.

BACKGROUND OF THE INVENTION

Various types of circuit multiplication apparatus are known in the patent literature and on the marketplace. One type of such apparatus is known as Time Assignment Speech Interpolation (TASI) Apparatus. There is described in applicant's published European Patent Application No. 25,465 and in applicant's corresponding to U.S. Pat. No. 4,523,309, TASI apparatus which has gained widespread market acceptance. The disclosure of the aforesaid European Patent Application and of U.S. Pat. No. 4,523,309 is incorporated herein by reference.

A particular feature of the abovementioned U.S. Pat. No. 4,523,309 is the fact that control information such as the assignment, synchronization and identification information is transmitted along the communication channels instead of on separate signalling channels as in the prior art. In addition, the signalling communication channel assignment information is also supplied via the voice channels rather than via the signalling channels.

There are known TASI systems in which the advantages of adaptive pulse code modulation (ADPCM) compression techniques have been incorporated, as described in a paper by Townes et al. entitled "Performance of an ADPCM/TASI System", International Conference on Communications, Seattle, Wash., June, 1980 (pgs. 42.6.1–5). Additional literature includes the paper by Agrawal, J. P. et al., entitled "The Design of an ADPCM/TASI System for PCM Speech Compression", IEEE Transactions on Communications, Vol. COM-29, No. 9 (1981).

It is pointed out in the paper by Agrawal et al. that the ADPCM technique is sensitive to the synchronism between the encoder and decoder with regard to the step sizes chosen to track the dynamic range of the prediction error. Transmission errors disturb this synchronism and a recovery time is required within which it can be reestablished.

There are no known communication systems which combine the TASI/ADPCM technique with the use of voice channels for transmission of control information. Such a combination would present a problem in maintaining the above-mentioned synchronism, since transmission of the control information represents an interruption on the voice channels.

SUMMARY OF THE INVENTION

The present invention seeks to provide a highly efficient digital circuit multiplication system.

There is thus provided in accordance with an embodiment of the present invention a digital circuit multiplication system for interconnecting a transmission link having a plurality of bearer channels to a second plurality of telephone communication trunks, said communication channels being transmitted via a bearer bit stream, the second plurality exceeding the first plurality, and comprising:

transmission apparatus at a first end of the transmission link including means for detecting signals on the second plurality of telephone communication trunks and means for assigning each trunk on which signals are present to an available on of the first plurality of bearer channels and for providing assignment messages indicating such assignments;

adaptive differential pulse code modulation transmitting means operative to be coupled to the first plurality of bearer channels and to transmit speech signals in bit reduced form;

combining means for receiving the output of the adaptive differential pulse code modulation transmitting means and combining them with said assignment messages along the first plurality of bearer channels;

signal receiving and message detection means at a second end of the transmission link and being operative to receive the speech signals and assignment messages transmitted via said combining means and to strip the assignment messages therefrom;

receiving apparatus coupled to the signal receiving and message detection means including means for receiving said assignment messages and assigning each of the first plurality of bearer channels carrying signals to a corresponding one of the second plurality of trunks in accordance with assignment information received from the transmission apparatus.

In accordance with one embodiment of the present invention, the signal receiving and message detection means comprises receive delay circuitry for temporarily storing the signals received from the adaptive differential pulse code modulation transmitting means;

message receiver means coupled to the receive delay circuitry for detecting assignment messages contained in the received signals; and message extractor means for receiving the delayed output of the receive delay circuitry and for providing output signals wherein the assignment messages are not present and are replaced by a predetermined signal pattern.

Further in accordance with an embodiment of the invention, the predetermined signal pattern corresponds to typical signals indicating the absence or near absence of speech.

Additionally in accordance with an embodiment of the invention, the signal receiving and message detection means also comprises quantizing means and predictor means and the predetermined signal pattern is configured so as to appear to the quantizing means and predictor means as if ordinary signals indicating the absence or near absence of speech were present.

Still further in accordance with an embodiment of the invention the assignment messages include a first number of bits containing assignment information and a second number of bits, exceeding the first number of bits devoted to identification code information.

Additionally in accordance with an embodiment of the invention, the assignment messages include a first number of bits containing assignment information and a second number of bits, substantially exceeding said first number of bits, devoted to identification code information.

Further in accordance with a preferred embodiment of the present invention, there is provided variable bit rate transmitting and receiving apparatus operative during times of overload for selectably reducing bit allocation and thus making available additional bearer channels.

Additionally in accorance with an embodiment of the present invention the variable bit rate apparatus is operative under overload conditions to assign the least significant bit of nibbles of a bearer bit stream to an additional speech signal sample, whereby the positions of the samples in the bit stream remain stable even when each channel is assigned a variable number of bits.

Additionally in accordance with an embodiment of the invention, there is provided apparatus for transmitting distributed control messages along the three most significant bits of nibbles of a bearer bit stream transmitted along the transmission trunk link, thereby to prevent interaction between operation the variable bit rate apparatus and operation of the apparatus for transmitting distributed control messages.

BRIEF DESCRIPTION OF THE DRAWINGS

The present invention will be understood and appreciated more fully from the following detailed description taken in conjunction with the drawings in which:

FIG. 13 is a block diagram illustration of a distributed control channel message transmitter employed in FIG. 2;

FIG. 14 is a block diagram illustration of a VBR control channel message transmitter employed in FIG. 2;

FIG. 15 is a block diagram illustration of a distributed control channel message receiver employed in FIG. 3;

FIG. 16 is a block diagram illustration of a VBR control channel message receiver employed in FIG. 3.

DETAILED DESCRIPTION OF A PREFERRED EMBODIMENT

Figure 1:
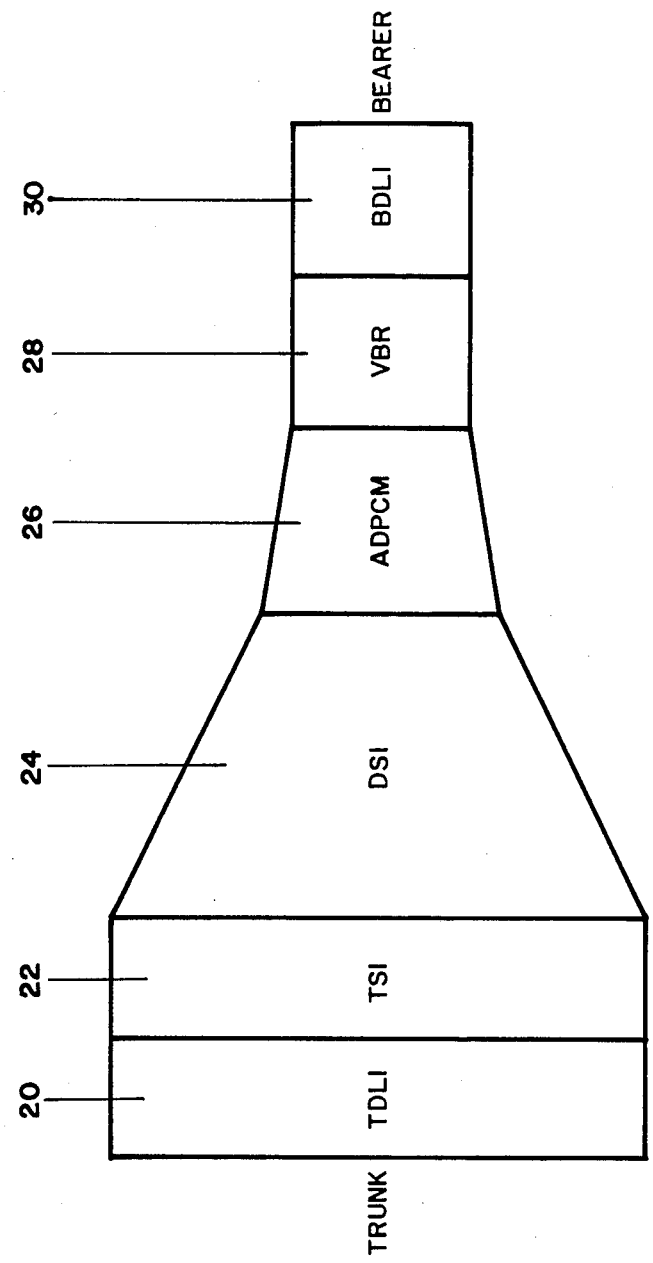
FIG. 1 is a functional block diagram illustration of the transmit side of the system showing graphically the trunk expanding functions of the digital circuit multiplication system constructed and operative in accordance with a preferred embodiment of the present invention.
Figure 2A:
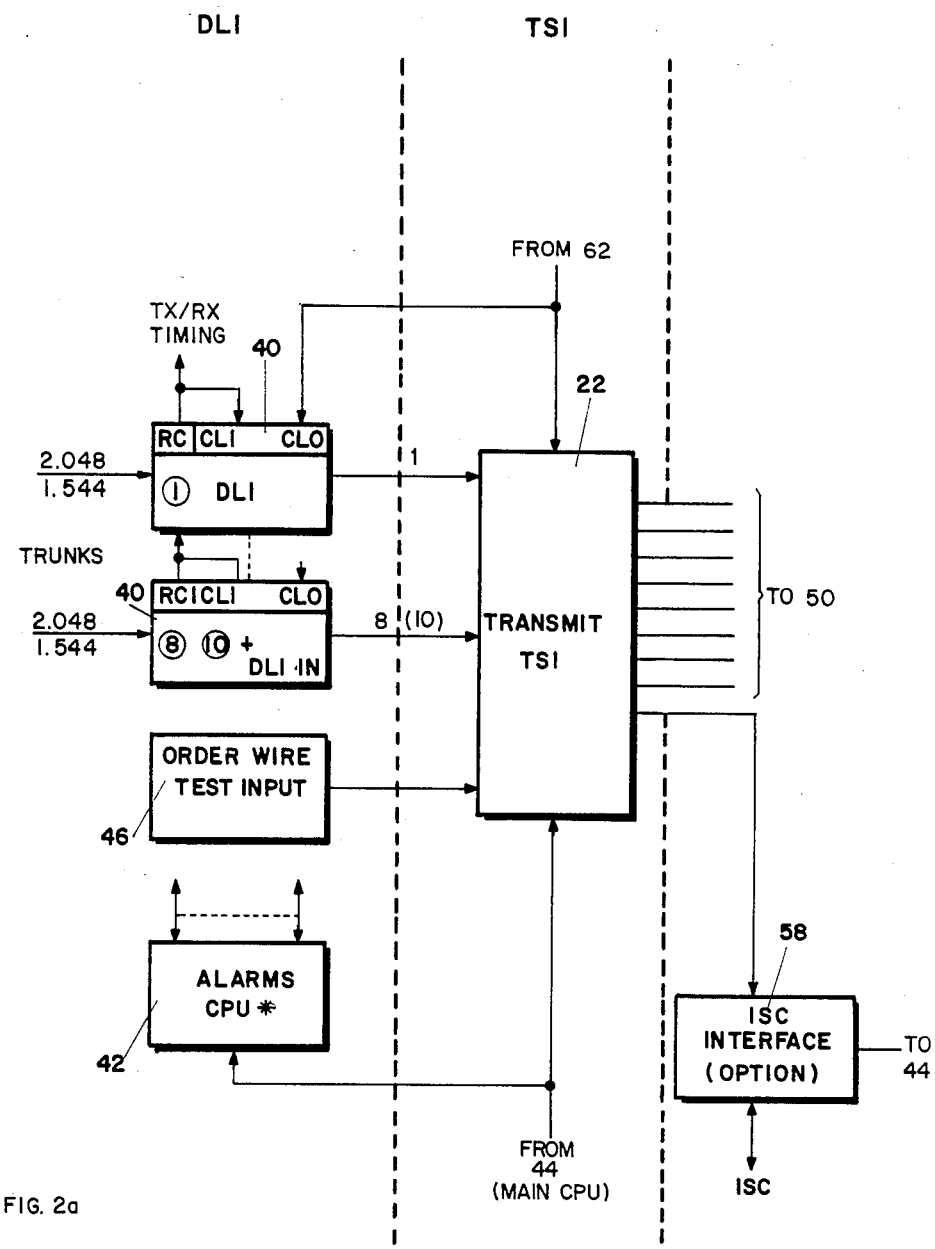
FIG. 2 is a block diagram illustration of transmit circuitry constructed and operative in accordance with a preferred embodiment of the present invention.
Figure 2B:
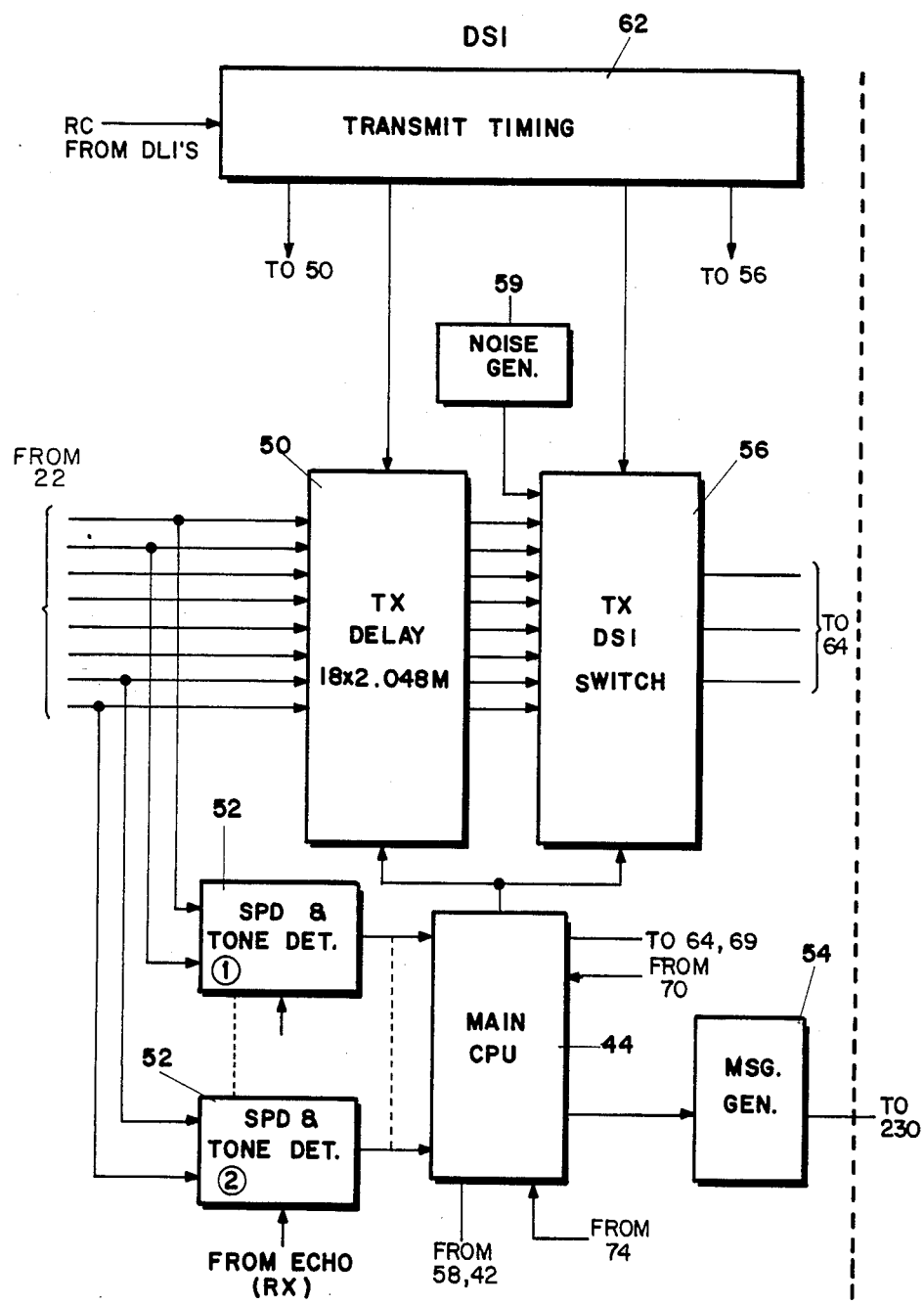
Figure 2C:
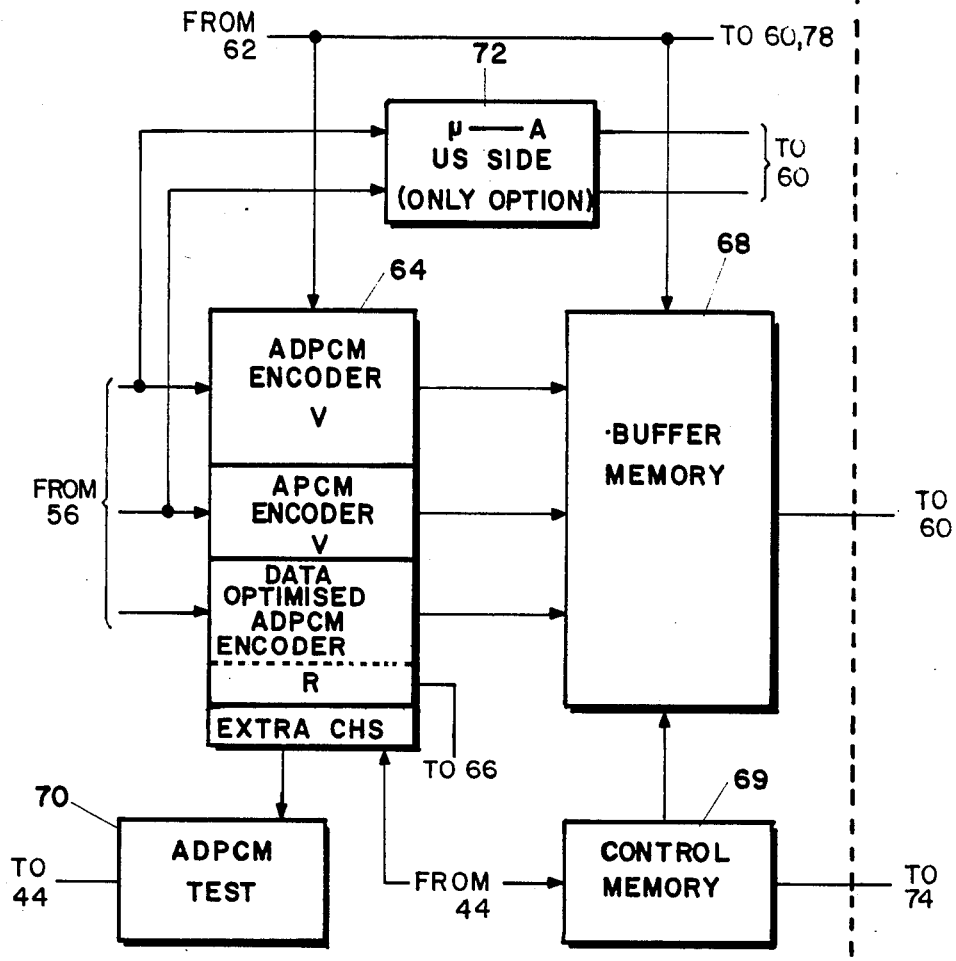
Figure 2D:
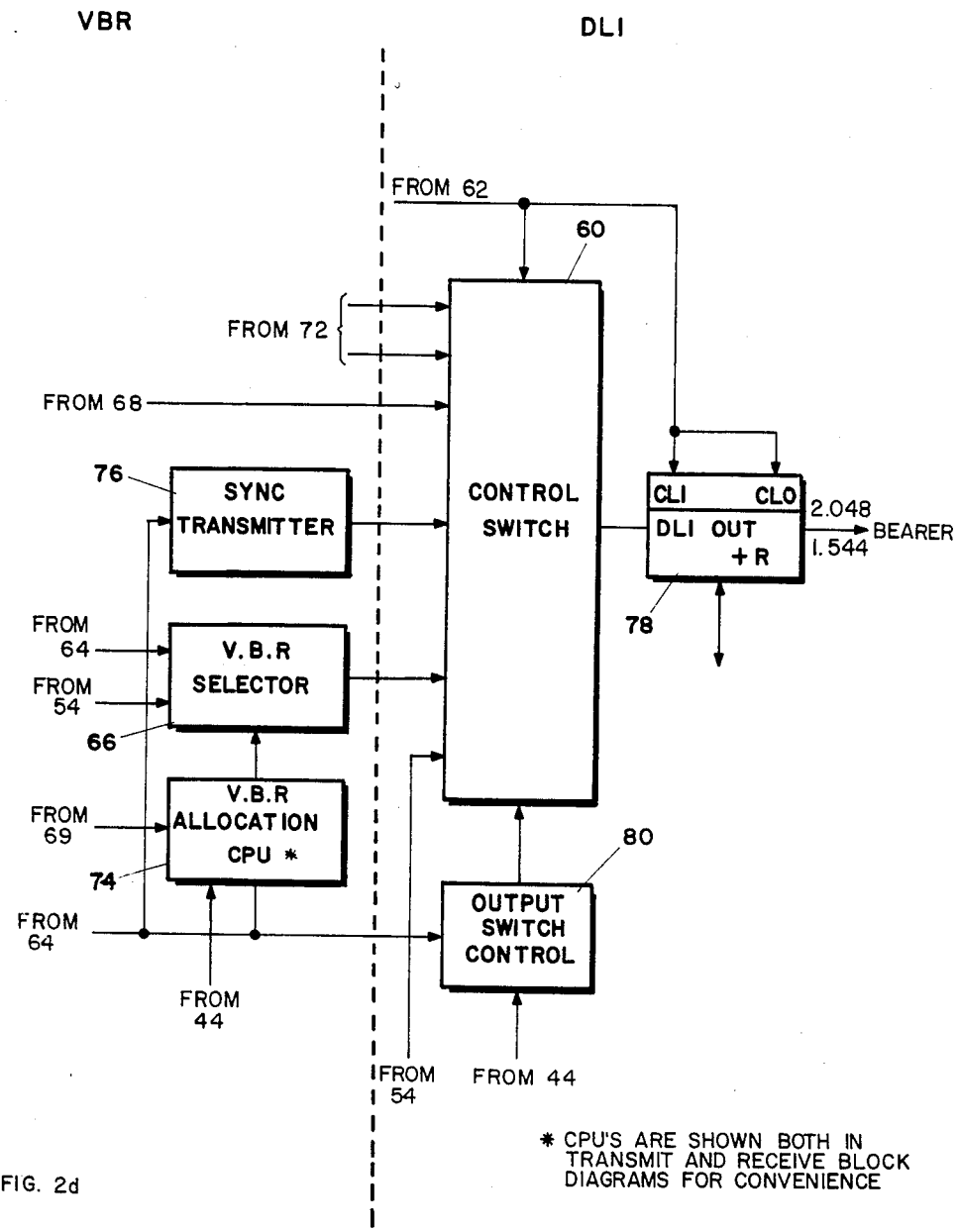
Figure 3A:
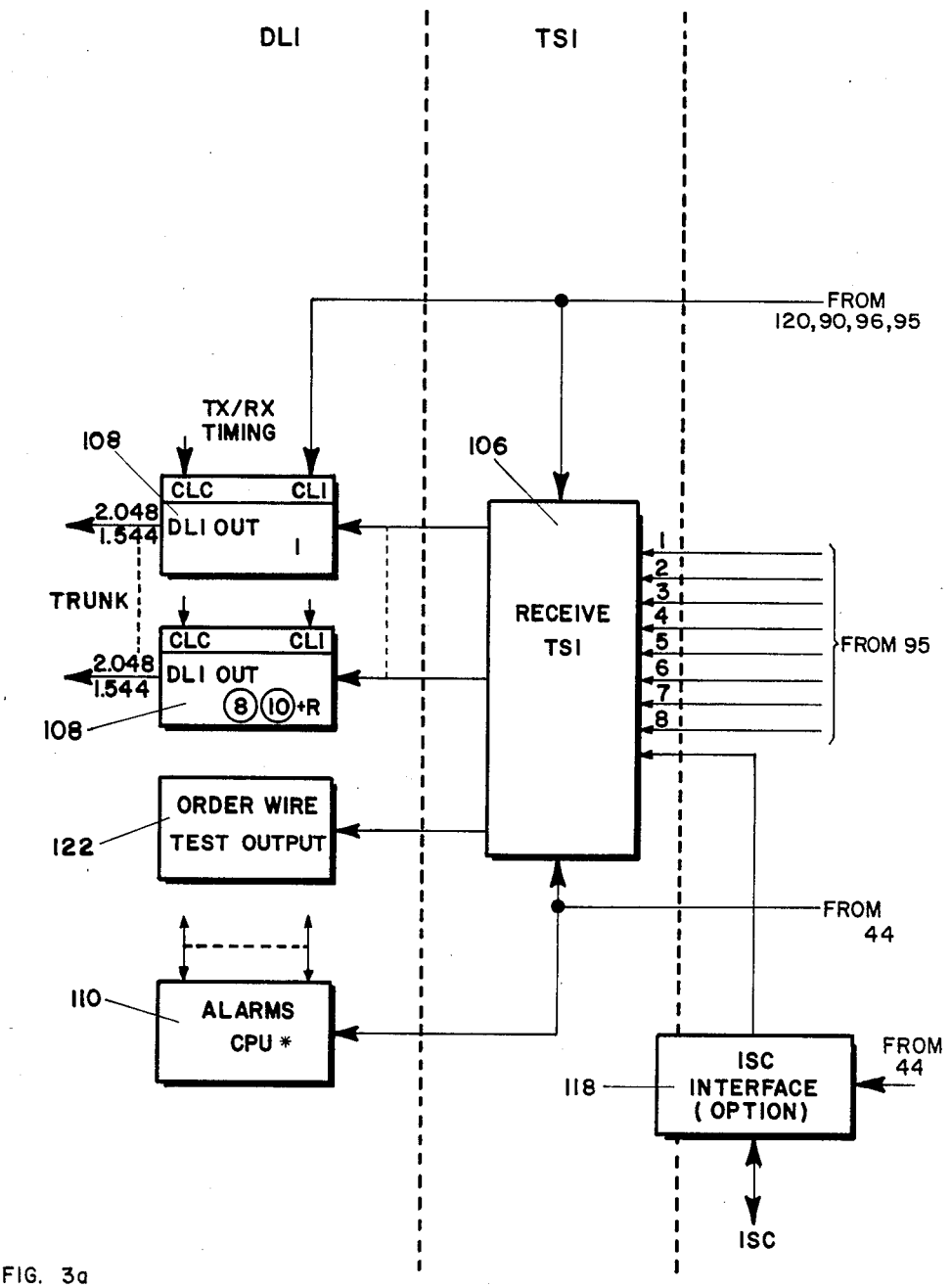
FIG. 3 is a block diagram illustration of receive circuitry constructed and operative in accordance with a preferred embodiment of the present invention.
Figure 3B:
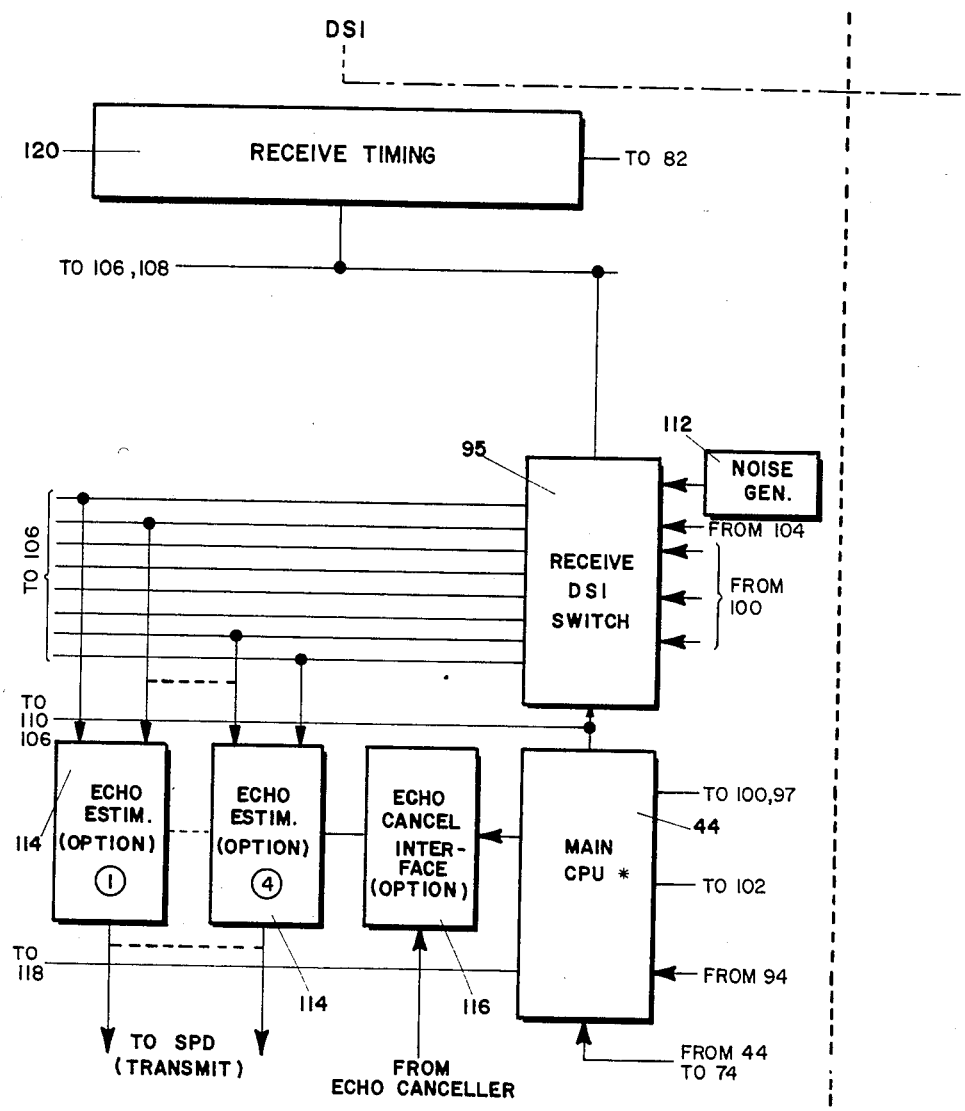
Figure 3C:
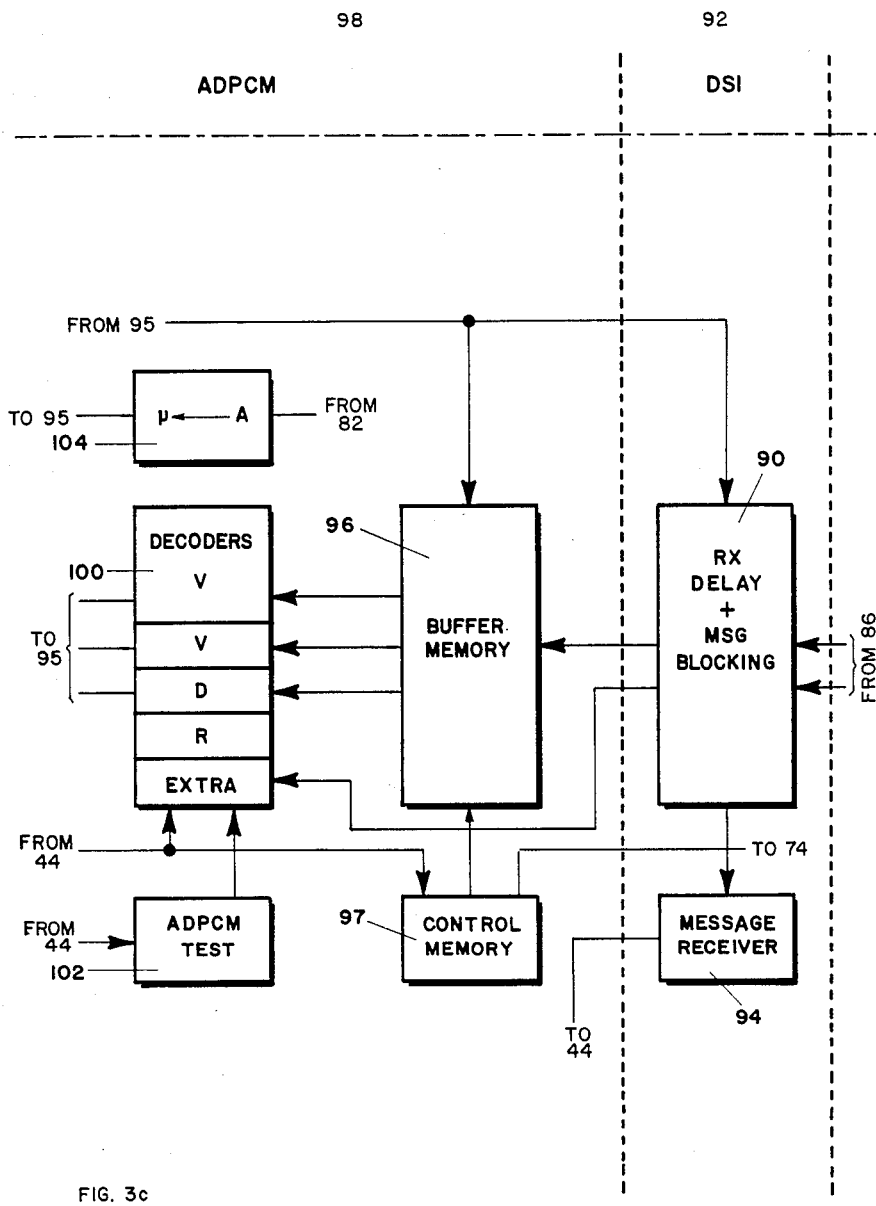
Figure 3D:
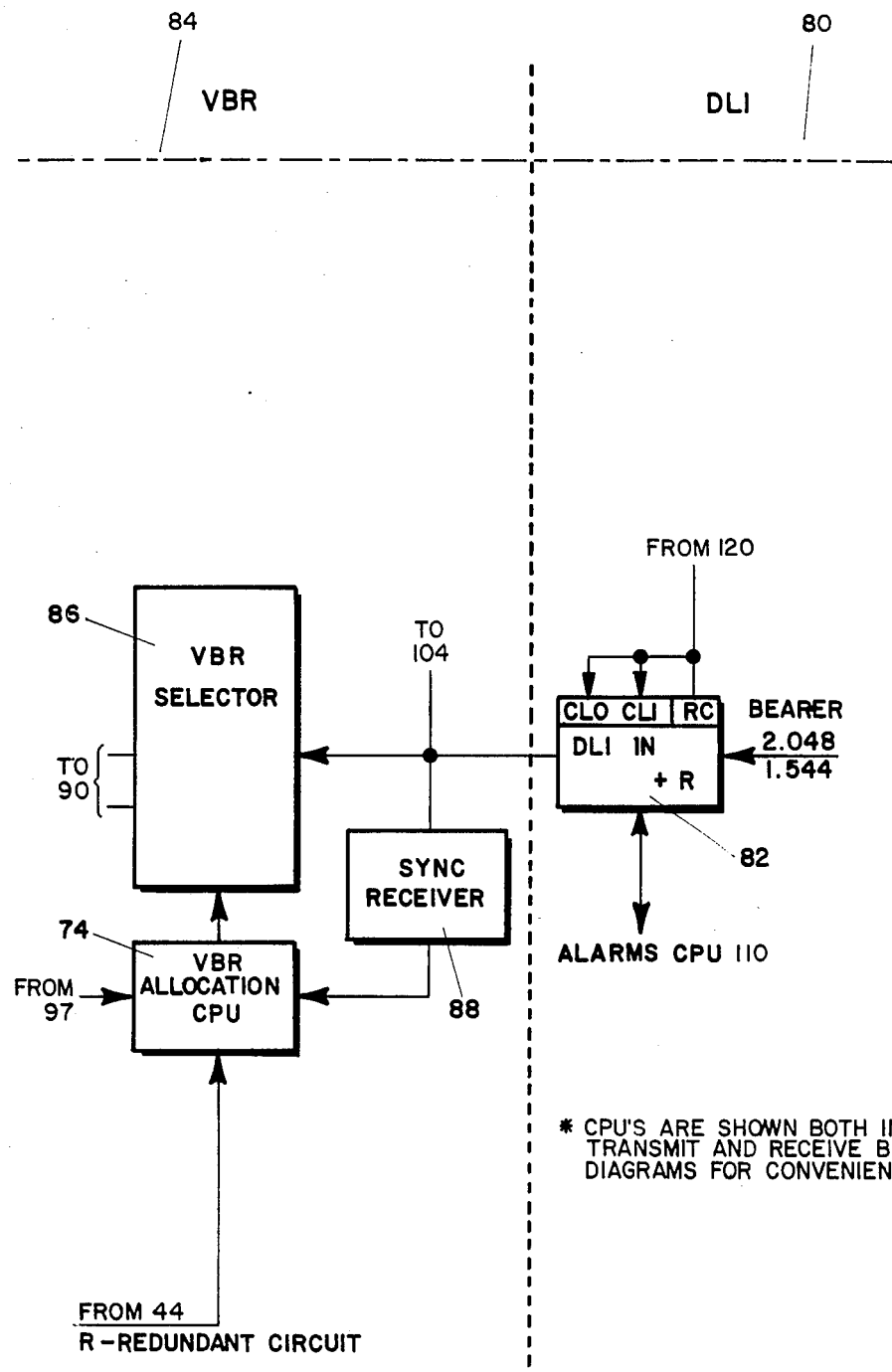

Reference is now made to FIG. 1, which is an overall functional system block diagram for the transmit side, which also indicates, generally to scale, the trunk expanding functions of the various elements of the system. The receive side is mirror symmetric and will not be described with respect to FIG. 1. The system includes a trunk PCM interface (TDLI) 20 which is operative to provide interfacing between 1.544 Mbps or 2.048 Mbps PCM signals and the internal 2.048 Mbps (NRZ) signals employed in the system.

In a preferred embodiment, TDLI 20 operates in the network at a concentration of 150 64 Kbps trunks on one 2.048 Mbps bearer. This concentration may be increased to 240 trunks per 2.048 Mbps bearer where the busy-hour traffic is spread out.

The TDLI is operative to provide synchronization, plesiochronous buffering and optical format conversion.

Downstream of TDLI 20 there is provided a time slot interchange (TSI) 22 which provides time slot mapping. It enables up to ten 24-channel bit streams to be regrouped into eight 30/32 channel bit streams and is implemented using a VLSI Time/Space PCM switch, such as the Siemens PEB 2040, as will be described hereinbelow.

As noted, from a consideration of FIG. 1, neither TDLI 20 nor TSI 22 actually performs any truck expanding functions per se. The first stage trunk expanding function is provided by digital speech interpolation circuitry (DSI) 24. DSI 24 provides voice compression by means of time assignment speech interpolation (TASI) and is operative to compress up to 240 trunks generally into 62 bearer channels. The number of bearer channels may be effectively increased, as will be described hereinbelow, by the application of variable bit rate techniques. Much of the DSI circuitry is substantially similar to that described and claimed in the aforesaid U.S. Pat. No. 4,523,309, which is incorporated herein by reference, particularly in connection with FIGS. 2, 20-25, and 28-27 thereof. According to a preferred embodiment of the invention, the DSI 24 provides 2.5:1 multiplication.

Further multiplication of 2:1 is provided by Adaptive Differential Pulse Code Modulation (ADPCM) circuitry 26 which employs an ADPCM algorithm in accordance with the CCITT G.721 recommendation for compressing three 2.048 Mbps bit streams, containing at least 62 channels, into one 2.048 Mbps bit stream.

ADPCM 26 employs ADPCM codecs specifically optimized for reliable transmission of voiceband data including a 9.6 Kbps V-29 modem, using only 32 Kbps per channel. Voiceband data traffic is routed via these codecs.

Variable Bit Rate (VBR) circuitry 28 is also provided in accordance with a preferred embodiment of the present invention and is operative to effectively create additional bearer channels (in excess of 62) to overcome periods of traffic overload. VBR 28 achieves this function by dynamic allocation of three instead of four bits for a number of speech ADPCM codecs when excessive traffic demand occurs. During normal (non-overload) operation, 62 speech ADPCM codecs process speech with a 4-bit quantizer strictly in accordance with CCITT Rec. G 721. During overload conditions, more speech channels are created by a bit robbing technique. A 3-bit/sample coding is spread among all speech channels on a pseudo-random basis.

The operation of the VBR circuitry is controlled by a dedicated microprocessor in each terminal and is synchronized between the two terminals via an 8 Kbps synchronization channel which may be transmitted, for example, via bits 7 and 8 of each non-framing TSO.

Interface between the 2.048 Mbps output from the ADPCM stage to the standard 1.544/2.048 Mbps standard PCM bearer channels is provided by the Bearer PCM Interface (BDLI) 30.

Reference is now made to FIG. 2, which illustrates in block diagram form the transmit portion of the system of the present invention corresponding to the functional block diagram of FIG. 1. PCM signals from an International Switching Center or any other suitable source enter the system via TDLI 20 which includes a plurality of DLI cards 40, one for each bit stream.

Two types of DLI cards are typically provided, one type (DLI-A) being compatible with the 1.544 Mbps standard and another type (DLI-B) being compatible with the 2.048 Mbps standard.

The DLI cards perform the following functions:
A. Interface to bipolar line signal.
B. Conversion from bipolar to NRZ signal.
C. Timing Recovery.
D. Frame synchronization and plesiochronous buffering.
E. Alarm detection and interfacing to the Alarm CPU.
F. Providing an output to the TSI at a 2.048 Mbps bit rate.

According to a preferred embodiment of the invention, at least one redundant DLI card is provided along with apparatus for replacing a failing DLI card with the redundant card. Once a failure on any trunk DLI is detected, the bipolar input of that DLI is switched automatically to the redundant DLI. The NRZ output of the redundant DLI is switched into the system instead of the faulty DLI output by means of the TSI circuitry 22.

An alarms CPU 42 may be provided to monitor the alarm detection circuitry in each DLI for the following conditions:
A. Alarm Indication Signal (AIS).
B. Loss of signal.
C. Loss of frame.
D. Remote Alarm Indication (RAI).
E. Slips.

Additionally, the following separate cumulative counts of the above events may be stored for output:
A. Reframe rate.
B. Bit error rate.
C. Errored seconds.
D. Errored seconds rate.
E. Severe errored seconds.
F. Severe errored seconds rate.
G. Degraded minutes.
H. Slip rate.

The output can be provided on a periodic basis, immediate or upon demand. A main CPU 44, shown as forming part of the DSI circuitry, is informed of alarm conditions detected by the alarms CPU 42. The main CPU 44 controls the operation of the DLI cards via the Alarms CPU 42. For example, AIS and loopback conditions are initiated by the main CPU 44 and transferred to the appropriate DLI via the Alarms CPU 42.

An order wire test input circuit 46 may be provided to converse through the system for maintenance purposes and provides an output along an additionally partially utilized 2.048 Mbps bit stream. This bit stream contains a speech time slot originating from Order Wire Control panel and various test tones and test patterns for diagnostic purposes.

As noted hereinabove in connection with FIG. 1, TSI circuitry 22 is based on a VLSI PCM switch such as a Siemens PEB 2040. The outputs from all DLI cards 40 are serial 2.048 Mbps signals and they are clock and frame synchronized. The TSI 22 typically accepts up to 11 2.048 Mbps bit streams from DLI cards and one 2.048 Mbps from the Order Wire/Test circuit 46.

The PEB 2040 switch manufactured by Siemens may accept up to 16 2.048 Mbps bit streams and output 8 2.048 Mbps bit streams, where the output bit streams comprise a programmed combination of the time-slot of the input bit streams.

The TSI circuitry 22 typically performs the following functions:
A. Time slot (64 Mbps) mapping of the trunk bit streams on a semi-permanent basis in accordance with the map inserted through the operator station.
B. Arrangement of up to 10 2.048 Mbps bit streams originating from DLI cards, which contain only 24 active speech time slots, into eight fully utilized 2.048 Mbps bit streams. This function is required only in a terminal accepting 1.544 Mbps trunk bit streams.
C. Switching into the system a redundant DLI card in case of failure of one of the active DLI cards.
D. Insertion of the order-wire and test signals into specific time-slots.
E. Assignment of International Switching Center (ISC) information into fixed time slots on the output bit stream.

The TSI mapping is controlled by the main CPU 44. The output of the TSI comprises eight 2.048 Mbps bit streams which are bit and frame synchronized.

The eight 2.048 Mbps bit streams emerging from the TSI are supplied to the DSI circuitry 24 and are directed in parallel to a transmit delay memory 50 and to speech and tone detection circuitry 52. The transmit delay memory provides the time period during which speech detection, CPU processing and assignment message transmission take place without any speech clipping. Typical transmit delay duration is 21.875 msec. The transmit delay memory is typically based on 4 static CMOS memory devices and comprises 44800 bytes of information. The output of the transmit delay memory 50 has the same structure as its input, i.e. 8 serial 2.048 Mbps bit streams which are bit and frame synchronized.

Speech and tone detection (SPD) circuitry 52 typically comprises four SPD circuits, each of which receives 2×2.048 Mbps digital streams from the transmit TSI circuitry 22. The SPD circuitry 52 is operative to examine each time slot for the presence of speech energy above an adjustable threshold which is normally set at −32 dBmO. If internal DCMS echo control is provided, this threshold is dynamically adjusted by echo estimating circuitry forming part of the receive circuitry and shown in FIG. 3.

If speech energy is present, the main CPU 44 is notified which time slot has active speech. The response time of the speech detector is normally 8 to 10 msec., whereas the hangover time is normally 64 msec. The hangover time can be dynamically modified under the control of the main CPU 44. Additionally, the tone detector portion of the SPD circuitry 52 examines the active speech for the continuous presence of a 2100 Hz tone, the echo suppressor disable tone (per CCITT Rec. G-164). When the tone is detected, the CPU 44 is notified.

The main CPU 44 controls the DSI operation as well as functions of the digital circuit multiplication system (DCMS) of the invention. Its major task, in the transmit part of the system, is to receive speech and tone activity information and to assign an available bearer time slot to the active trunk. This is done by controlling the transmit DSI. The main CPU is typically based on the Intel 80286 microcomputer. Its software is taken mostly from apparatus of the type described in the aforesaid U.S. Pat. No. 4,523,309.

Other functions of the Main CPU are:
A. Controlling the TSI circuitry.
B. Disabling the transmit delay memory circuitry 50 for non-speech signals.
C. Activating control message transmission through a message generator 54.
D. Control of a transmit Digital Speech Interpolation (DSI) Output Switch 56.
E. Control of the DLI cards via the Alarm CPU 42.
F. Monitor of the ADPCM operation.
G. Control of the VBR circuitry 28.
H. Execution of self-test functions.
I. Communication with:
  1. The Alarm CPU 42.
  2. The VBR allocation CPU forming part of VBR circuitry 28.
  3. The control panel.
  4. The Operator station.
  5. Optional International Switching Center Interfaces 58.
  6. The far-end DCMS terminal(s).

The transmit Digital Speech Interpolation (DSI) Switch receives 8×2.048 Mbps digital streams from the transmit delay 50 and selects up to 96 time slots to form an output of three 2.048 Mbps digital streams in response to commands from the main CPU 44.

The 2×2.048 MPbs bit streams are then connected in parallel to the following circuits:
A. The ADPCM encoders (speech and data) which form part of ADPCM circuitry 26.
B. The optional Mu-law to A-law converter.

The standard 2.048 Mbps bit stream contains 30 speech time slots (TS), however in the DCMS when TS 16 is not used for transmission of signalling information, 31 time slots are available for speech. Therefore, each 2,048 Mbps bit stream comprises 31 speech channels, so that the output of the DSI Switch 56 contains 62 speech channels.

There exist occasions when a given trunk is connected at the far-end terminal in the Receive DSI switch, but the same trunk is not connected in the Transmit DSI switch (e.g. echo suppression, self test). In this case, complete silence will be transmitted to the far-end subscriber through the perfect digital connection. Therfore an optional noise generator 59 is provided for inserting idle channel noise into any outgoing idle time slot. The output level of the noise generator is adjustable from −45 to −65 dBmOp.

The optional International Switching Center (ISC) Interface 58 may receive up to eight 2.048 Mbps digital streams from the transmit TSI and is employed to receive ISC communications from the trunk circuits (time slots) when required. The information thus received is decoded and passed to the main CPU 44. Alternatively, the ISC interface may receive the signalling information directly from the ISC via a data link such as a V. 24/RS-232 interface.

The message generator 54 receives 2 bytes (16 bits) of message information from the main CPU 44, which identifies the contents of a control message along with the channel number on which the message should be transmitted. The message generator typically combines the 16 bits of message data with 56 bits of fixed identification code and error correction code to form a 72 bit message. This message is transmitted using the specified nibble (three out of four bits of each nibble) in each frame during 24 consecutive frames. Therefore, the total message transmission time is 3 msec.

The 72 bit message is organized as follows:
A. A code of 49 bits for message identification purposes.
B. 16 bits of data which allows for 32,768 different messages.
C. 7 bits of error detection and correction code.

The message generator then sends the 72 bit message to an output switch 60 forming part of the BDLI circuitry at a rate of 2.048 Mbps.

Transmit Timing circuitry 62 selects a synchronization source from:
A. Any of the recovered clocks in one of the trunk DLI cards (independent or master in master-slave modes).
B. The recovered clock of the bearer DLI card (slave in master-slave mode).
C. External clock source.
D. Internal clock source.

The DCMS timing is synchronized with the synchronization source using a two-stage Phase Lock Loop (PLL) circuit (not shown). Control logic is provided in the first stage to ensure the provision of a wide incoming jitter capture range. The second stage has high Q to ensure good output and transfer jitter performance. The output of the high Q PLL drives a timing generator (not shown) which provides the various timing pulses to all transmit paths of the DCMS terminal.

ADPCM circuitry 26 comprises an ADPCM encoder assembly 64 which receives three 2.048 Mbps digital streams from the transmitting DSI switch 56. These three streams contain up to 96 speech time slots. During normal operation 62 time slots are processed by 62 per channel ADPCM encoders. Each ADPCM encoder converts either Mu-Law or A-Law 8-bit PCM samples into 4 bits in accordance with CCITT Rec. G721.

The ADPCM encoded time slots are then passed to the transmit output switch 60 as a 2.048 Mbps digital stream carrying up to 62 nibble time slots. Each ADPCM encoder can be controlled by the VBR circuit 28 to output either 3 or 4 bits per sample. During excessive traffic conditions additional effective speech channels are created by the VBR circuitry 28. As a result additional encoders are activated, sharing the available bits on the bearer output. The extra encoders are identical to the original 62 encoders incorporated in assembly 64 and their output is fed to a VBR selector 66 forming part of VBR circuitry 28. Additionally N+1 redundancy is provided on the ADPCM encoders.

Additional ADPCM encoders are dedicated for voiceband data signal transmission. They are specifically optimized for this purpose and therefore they can provide reliable transmission of modem signals, including 9.6 Kbps V-29. Any voiceband data signal detected by the tone detector is routed via one of these decoders. The outputs of all of these encoders are combined in a buffer memory 68 to a single 2.048 bit stream. Buffer memory 68 is controlled by the main CPU 44 through control memory 69.

An ADPCM test decoder periodically tests each ADPCM encoder for proper encoding in response to commands from the main CPU 44. If an encoder is found to be faulty, the CPU is notified and one of the 10 redundant encoders is switched in to replace the faulty one.

A Mu-law to A-law converter 72 receives two 2.048 digital streams and performs Mu-Law PCM to A-law PCM conversion. The output of converter 72 comprises two 2.048 Mbps A-Law digital streams which are supplied to the transmit output switch 60.

The variable bit rate circuitry 28 includes VBR selector circuitry 66 which, under the control of a VBR allocation CPU 74, determines the routing of the 3 or 4 bit ADPCM emerging from each encoder 64 and the 3 bit (triplets) from the Message Generator 54 to the transmit output switch 60, replacing the least significant bits of the "robbed" time slots. The VBR selector circuitry 66 provides assignment message transmission along all speech channels including the VBR derived channels.

The VBR allocation CPU 74 receives information from the main CPU 44 as to how many channels are required and as to the location of the data channels. On the basis of this information and using a built in pseudo-random generator, the VBR CPU 74 controls the VBR selector 66 and the output switch 60 for the proper allocation of the bits in each frame.

A. sync transmitter 76 provides transmission of the 8 Kbit/sec control channel under the control of the VBR CPU 74. The VBR control message bit is inserted into 16 non-framing Time slot 0 (TS0) at bit locations 7 and 8.

The bearer PCM interface comprises transmit output switch 60 which receives 2.048 Mbps digital streams from:
A. The ADPCM encoder 64.
B. The u-Law to A-Law converter 72.
C. The message generator 54.
D. The VBR Selector 66.

The output switch combines selected 8, 4 or 3 bit time slots from these various inputs under command from the main CPU 44 and arranges them in a single 2.048 Mbps digital stream. Time slot number 0 is reserved for framing information on the bearer and VBR synchronization channel. The output switch 60 is operative to provide the combined 31 time slot bit stream to the remainder of the BDLI circuitry.

The remainder of the BDLI circuitry 30 comprises a bearer DLI interface 78 which receives a 2.048 Mbps NRZ digital stream from the transmit output switch 60 and adds framing information to the time slot 0. The digital stream is converted to a bipolar HDB3 digital stream and interfaces with higher hierachy multiplexers such as used in the TAT-8 undersea cable project. 1+1 redundancy is provided for the bearer DLI interface.

The BDLI interface 78 is substantially identical to the trunk DLI interface 40 which receives a 2.048 Mbps digital signal. The Alarms CPU 42 monitors and controls the BDLI interface 78 in the same manner as described above for the TDLI interface 40.

For applications on 1.544 Mbps bearer circuits the BDLI is identical to the TDLI which accepts a 1.544 Mbps digital signal. The 2.048 Mbps digital stream passed to this BDLI contains 24 active channels and the framing is added as a 193rd bit.

Reference is now made to FIG. 3 which illustrates in bock diagram form the receive circuitry which, together with the transmit circuitry described hereinabove, defines a complete DCMS system.

The receive circuitry of FIG. 3 comprises BDLI circuitry 80 including a BDLI interface 82 which is substantially identical to the interface 78 described hereinabove. Interface 82 receives a bipolar HDB3 bit stream at a rate of 2.048 Mbps from a suitable demultiplexer such as that employed in the TAT-8 system. Optionally, the system may be equipped for a 1.544 Mbps bit stream. Selection of either the 2.048 Mbps (DLI-E) or the 1.544 Mbps (DLI-A) interface is achieved by plugging in the required interface card.

The DLI card incorporated in interface 82 performs the following functions.
A. Interface to bipolar line signal.
B. Conversion from Bipolar to NRZ signal.
C. Timing recovery.
D. Frame synchronization.
E. Alarm monitoring, detection and interfacing to alarm CPU 42.
F. When DLI-A is employed, that is in a terminal accepting 1.544 Mbps trunk bit streams, frame and rate adjustment to internal 2.048 Mbps format is performed.

VBR circuitry 84 includes a VBR selector 86 which receives the bit stream from the bearer side. The VBR circuitry is operative to properly allocate the received bits to form the 3- or 4-bit channels according to instructions received from the VBR allocation CPU 74 (FIG. 2) which forms part of the transmit circuitry.

The VBR allocation CPU 74 receives information from a sync receiver 88 located at the far end and from a built-in pseudo random generator located in CPU 74. The sync receiver 88 is operative to extract the relevant bits from the TS0 in order to assembly the 8 Kbit/sec control channel bit stream and transmits this information to the VBR Allocation CPU 74 via this control channel for synchronizing the pseudo-random generator.

The output of VBR selector 86 contains 62 or more channels and is supplied to RX delay and message blocking circuitry 90, which forms part of a receive DSI circuitry 92.

The function of this delay is to provide the time period required for detection of control messages by a message receiver 94 and to remove detected messages from the 2.048 Mbps bit stream so that they are not passed on to the ADPCM decoder. The receive delay duration is typically 3.75 msec.

The receive delay is typically based on a single static CMOS memory device. The output from the receive delay 90 comprises two serial 2.048 Mbps bit streams.

When a message is detected on one of the nibble time slots, an idle code is substituted for these specific nibbles so that the output bit stream does not contain the control message. The message receiver performs a high speed scanning of the receive delay memory channel after channel for all 62 nibble time slots and additional time slots. Each channel is scanned in less than 6 microseconds (12/2,048) All channels are scanned during 0.375 msecs (3PCM frames). The message length of 3 msec plus scan time of 0.5 msec is smaller than the length of the receive delay to ensure message detection.

The message receiver 94 looks for the exclusive message identification code and message contents following it. Once detected, the message contents are corrected using the error correction code. The corrected message contents are transferred to the main CPU 44. The main CPU 44 has been described hereinabove and, as noted above, controls both transmit and receive functions. The principal receive function of the Main CPU 44 is to control a receive DSI switch 95 in accordance with assignment messages received.

The delayed output of receive delay 90 is supplied to a buffer memory 96 which forms part of ADCPM circuitry 98. The buffer memory 96 outputs to ADPCM decoders 100 and is controlled by the main CPU 44 through control memory 97. Each ADPCM decoder accepts a one 2.048 Mbps digital stream and converts it to two 2.048 Mbps digital streams.

The input bit stream comprises 62 or more nibbles of ADPCM represented speech. Each nibble is processed by a per channel ADPCM decoder. Each ADPCM decoder converts the 4- or 3-bit PCM samples according to CCITT Rec. G.721 into either u-law or A-law 8-bit PCM samples. The two 2.048 Mbps output bit streams contain at least 31 8-bit time slots each.

Additional ADPCM decoders are provided for processing of voiceband data signals. An optimised ADPCM algorithm is implemented on a Digital Signal Processor (DSP) device per every voiceband data channel. Any data call detected by the far end tone generator 52 (FIG. 2) will be routed through the receive circuitry via the additional ADPCM decoders.

An ADPCM test encoder 102 provides an additional input to the decoders 100 for periodic testing thereof in response to commands of the main CPU 44. The ADPCM test encoder 102 operates by inserting a known signal pattern to the decoders 100. The output of the decoder under test is monitored by test circuitry on an Order Wire card 22. Should a decoder be found to be faulty, a redundant decoder is switched in by the CPU 44 to replace the faulty one.

An A-law to Mu-law converter may be provided to receive the 2.048 Mbps bit stream and perform an A-law to Mu-law conversion.

The receive DSI function is performed in two parts: one before the ADPCM stage and the second after the ADPCM stage. The first part has been described hereinabove.

As noted above, the main CPU controls both transmit and receive functions. In addition to the principal functions of the Main CPU 44 which have been described hereinabove, the CPU also is operative to carry out the following tasks:

A. Control of a TSI switch 106.
B. Routing of 64 Kbps data signals around the receive delay and ADPCM decoder.
C. Reception of various control messages other than speech assignments via the message receiver and responding accordingly.
D. Control of DLI cards 108 via an Alarm CPU 110.
E. Monitoring of the ADPCM decoding.
F. Controlling the VBR circuitry 84.
G. Optionally controlling echo suppression operation.
H. Optionally communicating with an external echo canceller to perform an echo elimination function.

The receive DSI 95 switch receives two 2.048 Mbps digital streams from the ADPCM decoder 100. These bit streams contain up to 31 8-bit speech time slots each. 64 Kbps data is routed through the disabled receive delay 90 and the disabled ADPCM decoder to the receive DSI switch 95.

All inputs to the receive DSI switch 95 are 8 bit PCM time slots. They are switched up to eight 2.048 Mbps bit streams under control of CPU 44 in accordance with the routing message received from the far end terminal.

Any trunk output not connected to a signal coming from the far end terminal is connected to an idle channel noise generator 112. The noise is injected to idle trunks to achieve the effect of real connections even when no physical conneciton is provided. The noise level is adjustable between −45 to −65 dBmop.

Where integral echo control is required, echo estimator cards 114 may be provided to calculate the magnitude of the estimated echo magnitude for each trunk.

The echo estimator 114 operates in conjunction with the speech detector 52 (FIG. 2). Each echo estimator card calculates the echo magnitude for four 2.048 Mbps bit streams (i.e. 120 trunks), Thus, each speech detector card processes two 2.048 Mbps bit streams (i.e. 60 trunks), each echo estimator card feeds two active speech detector cards.

The echo estimation technique used herein takes into account the worst case hybrid return loss as well as the worst case tail circuit round trip delay. The estimated echo for each trunk is compared in the speech detection circuitry with the tarnsmit signal on that trunk. The speech detector can then determine whether the speech activity present on a given trunk is echo or near-end originated speech.

Where external echo canceller operation is required, an interface 116 between the echo estimator and the external echo canceller may be provided. The echo estimator takes into account the echo return loss enhancement of the echo canceller.

An optional International Switching Center (ISC) interface 118 may be connected with the receive TSI 106 via a 2.048 Mbps bit stream. It is employed to isert ISC communication into specified time slots of one or more trunk bit streams. This DSMS into ISC information is inserted under the command of the main CPU 44. Alternatively, the ISC information may be transmitted via a suitable data link.

Receive timing circuitry 120 is synchronized to the incoming bit stream. In case of clock synchronization failure, a default internal clock source is selected.

In order to overcome the large wander and jitter accumulated along the overseas link and still achieve an excellent output stability, a two stage PLL scheme is implemented. The first PLL has low Q and absorbs most of the incoming jitter. The second PLL has high Q and is based on a VCXO so it has a very stable output.

The output of the second PLL drives a timing generator which provides the various timing pulses to all receive units of the DCMS terminal.

The receive TSI 106 receives eight 2.048 mBps digital bit streams from the receive DSI switch 95 and, under control of the CPU 44, switches individual 8 bit time slots to up to ten 2.048 mBps digital streams connected to a receive DLI 108.

In cases where the trunk interface to the receive DLI 108 is 1.544 mBps, the receive TSI arranges the 2.048 Mbps digital streams with only 24 active 8-bit time slots each.

If the trunk interface to the receive DLI 108 is 2.048 Mbps, the receive TSI arranges the eight 2.048 Mbps digital streams with 30 active 8-bit time slots each. The receive TSI also switches one of the bit streams from a faulty DLI to the redundant one.

Additionally the receive TSI 106 interfaces with an order wire and test output 122 via a 2.048 mBps digital stream and can connect 8 bit time slots to the path under command from the CPU. The receive TSI is also operative to distribute messages to the ISC whenever the communication with the ISC is conducted via the trunk digital bit streams.

There are up to 10 DLI cards 108 feeding PCM signals to International Switching Centers or other suitable switching facilities.

The trunk input part of the DLI card has been described hereinabove. The remainder of this card deals with the trunk PCM output. It receives a 2.048 Mbps digital stream from the receive TSI and stores it in a plesiochronous buffer. The plesiochronous buffer is read at a rate of 2.048 Mbps or 1.544 Mbps. The read clock source depends on the DCMS synchronization mode selected. The appropriate frame synchronizer codes are inserted in the bit stream.

In case of specific alarm condition, the responsive bit pattern is inserted. The NRZ bit stream is AMI/HDB3 encoder and converted to standard bipolar form.

The Alarms CPU is described hereinabove. It controls the operation of the DLI cards and the insertion of alarm conditions of each of the bit streams.

The order wire and test output 122 is connected to the receive TSI via a 2.048 mBps digital stream. It is used to receive order wire 8-bit time slots from the far end terminal order wire input. This circuit provides for receiving various test signals under control of the CPU or the craftsperson in the performance of system and network quality tests.

Figure 4A:
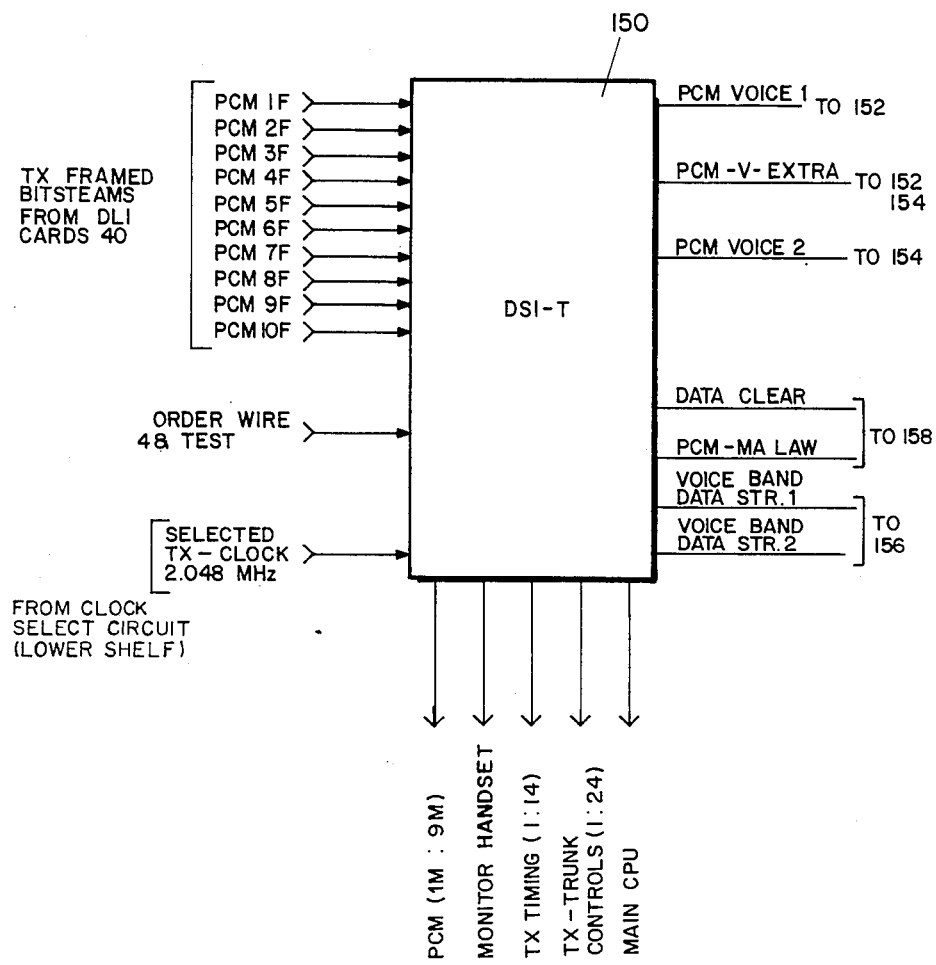
FIG. 4 is a block diagram illustration of the transmit speech flow circuitry in the apparatus of FIG. 2.
Figure 4B:
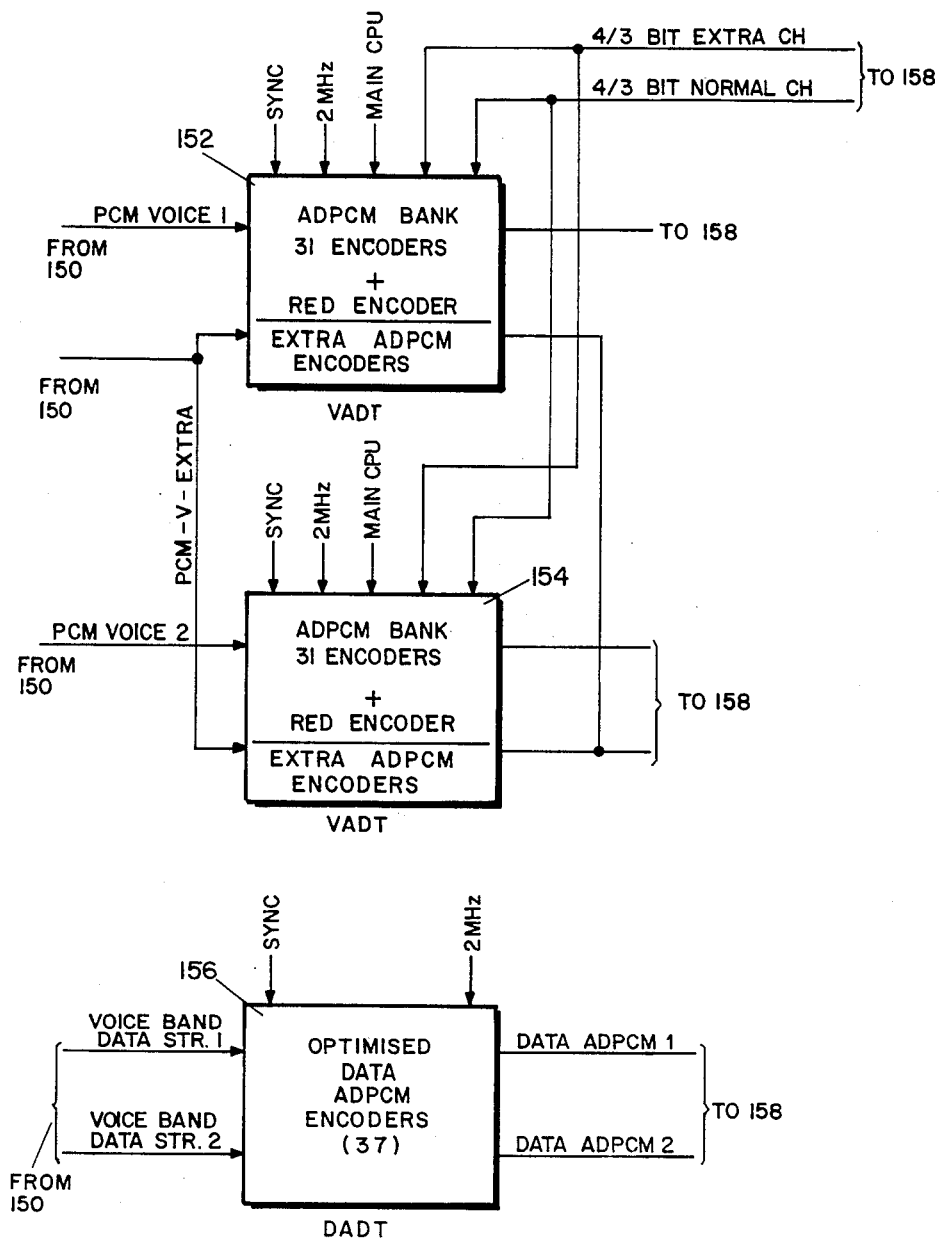
Figure 4C:
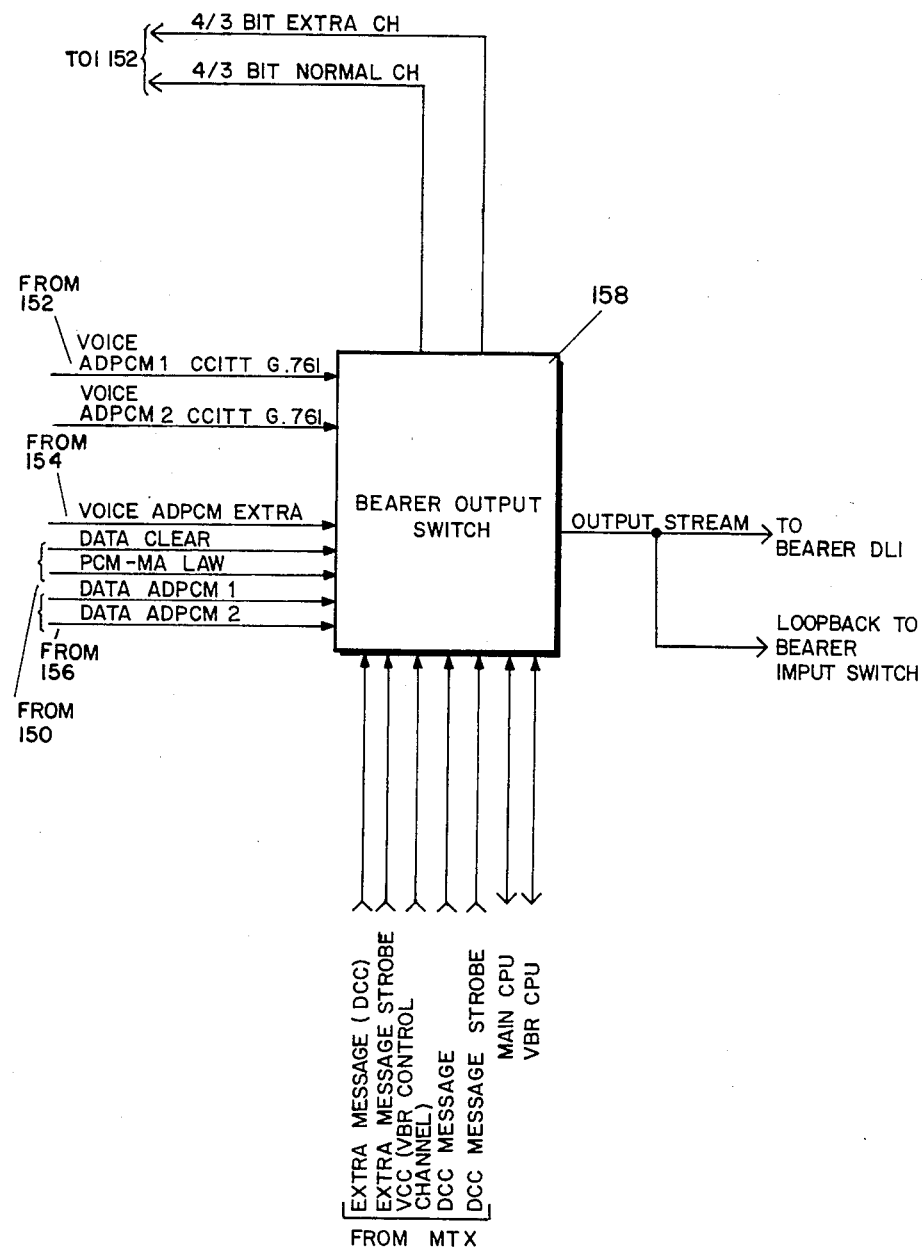
Figure 5A:
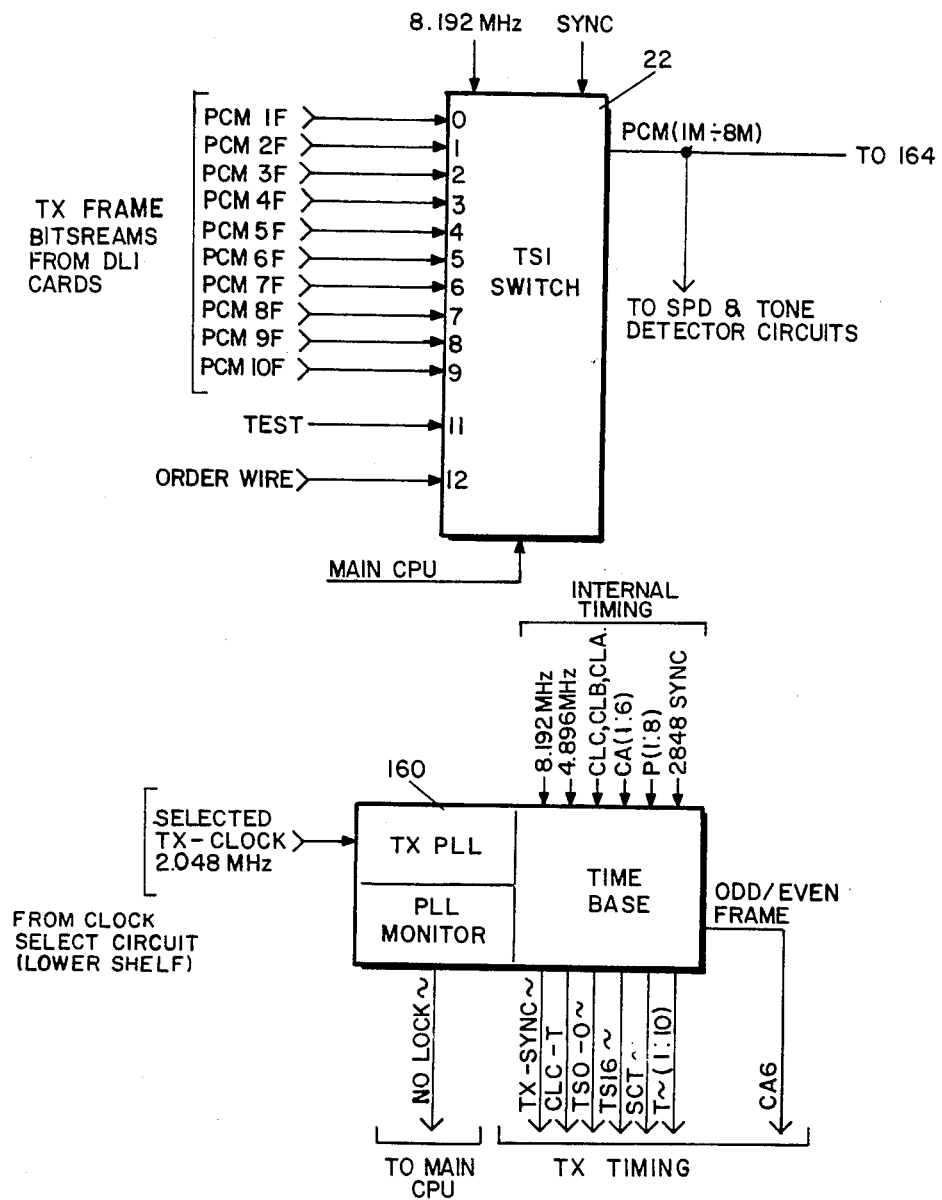
FIG. 5 is a block diagram illustration of the transmit digital speech interpolation circuitry forming part of the apparatus of FIG. 2.
Figure 5B:
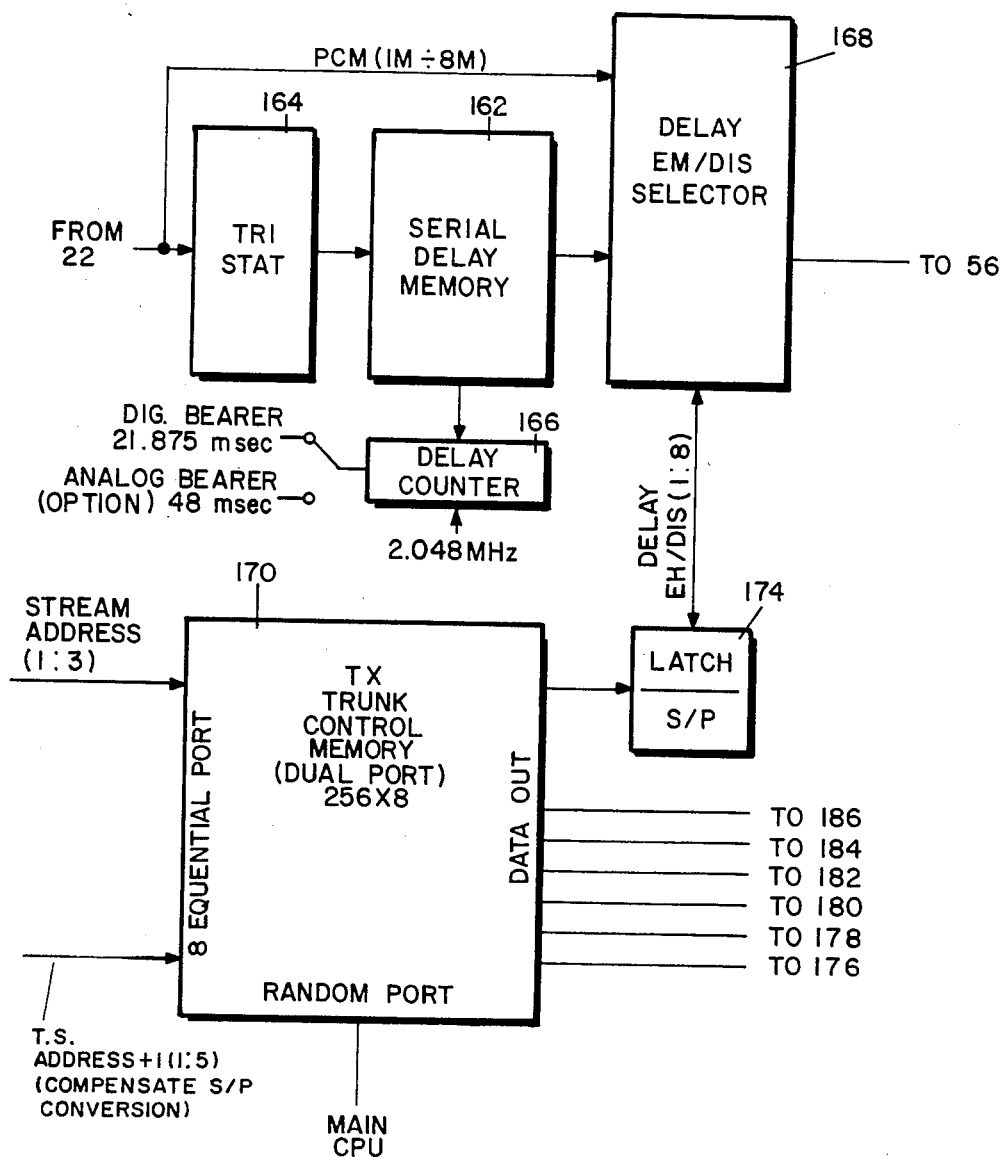
Figure 5C:
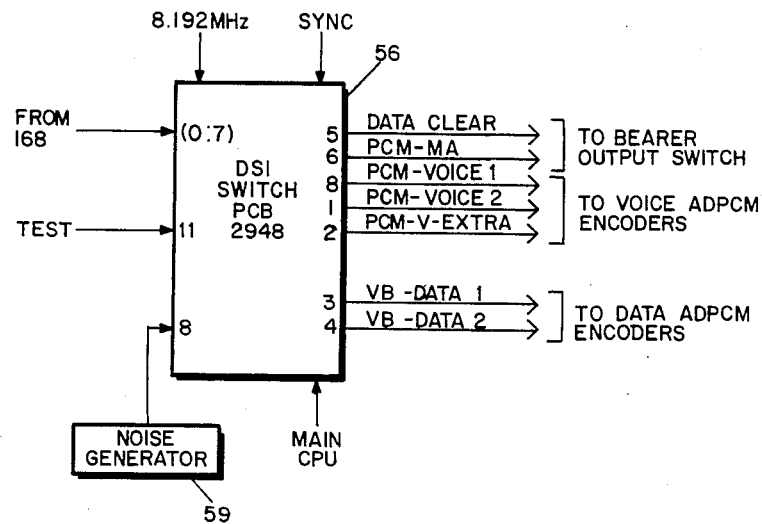
Figure 5C:
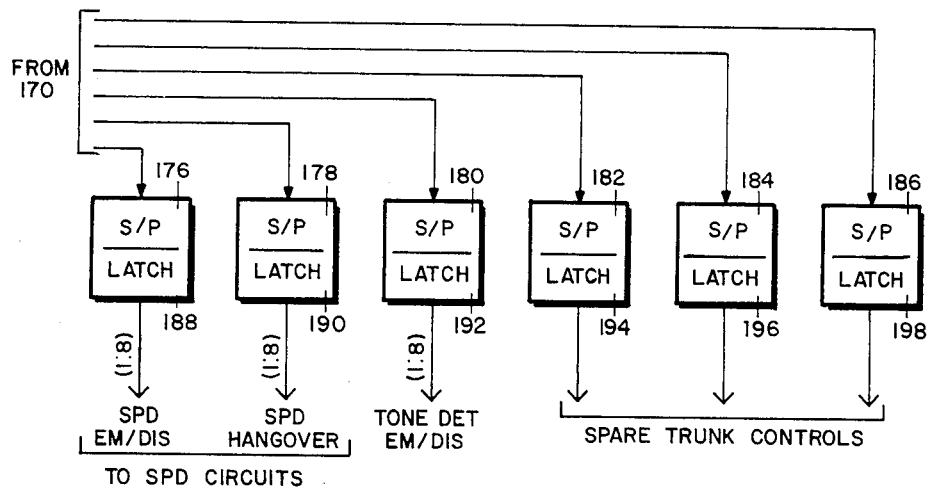

Reference is now made to FIG. 4, which is an interconnection diagram of the major components of the transmit circuitry of FIG. 2.

DSI-T circuitry 150, which comprises the TSI circuit 22 and DSI circuit components 50, 56, 59 and 62, receives inputs from the DLI cards 40 and from order wire test input circuitry 46. Transmit timing circuitry 62 (FIG. 2) provides clocking inputs to circuitry 150.

DSI-T circuitry 150 provides the following outputs:

A. Two PCM bit streams, each of which is supplied to a respective ADPCM encoder 152, 154 for normal channels, i.e. not derived from operation of the VBR circuitry.
B. One PCM bit stream which is supplied to both ADPCM encoders 152 and 154 for feeding the extra channels, i.e. those derived from operation of the VBR circuitry.
C. Two PCM bit streams which are supplied to optimized data ADPCM encoders 156 for carrying voice band data signals.
D. Two PCM bit streams which are fed directly to bearer output switch circuitry (BOS) 158 for carrying signals in an 8-bit/channel mode.
E. Eight PCM bit streams originating from from the transmit TSI circuitry 22 (FIG. 2), which is incorporated in DSI-T circuitry 150, which are directed to the speech detection and tone detection circuitry 52 (FIG. 2).
F. A bit stream which is directed to a monitor.
G. A plurality of timing outputs which are directed to various circuit elements in the apparatus of FIG. 2.
H. Transmit trunk control bits which are supplied to the speech detection and tone detection circuitry 52.

The main CPU 44 communicates with the DSI-T circuitry 150 via a bidirectional bus.

ADPCM encoders 152 and 154 also include redundant encoders which are switched into operation when needed by the CPU in response to sensed failure of an operating encoder.

The BOS circuitry 158 comprises output switch 60, VBR selector 66, buffer memory 68, control memory 69, and Mu-law to A-law converter 72, all of which are illustrated in FIG. 2. BOS circuitry 158 receives the following inputs:

A. Three bit streams comprising compressed voice signals from ADPCM encoders 152 and 154, two for normal channel transmission and one for extra channel transmission.
B. Two bit streams comprising compressed voice-band data signals from ADPCM encoders 156.
C. Two PCM bit streams from DSI-T circuitry 150;
D. The following outputs from MTX circuitry which includes the message generator 54 and sync transmitter 76 (FIG. 2):
  1. DCC—distributed control channel messages to be transmitted along the normal channels along with DCC message strobe.
  2. EXTRA DCC—distributed control channel messages to be transmitted along the extra channels along with EXTRA DCC message strobe.
  3. VCC—VBR control channel messages.

The main CPU 44 and the VBR CPU 74 each communicates with the BOS circuitry 158 via a separate bidirectional bus.

The output of the BOS circuitry 158 is a combined bearer channel bit stream which is supplied to the bearer DLI interface 78 and includes a combination of the above-listed inputs to the BOS circuitry.

BOS circuitry 158 is also operative to control the operation of ADPCM voice encoders in circuits 152 and 154, for determination of the number of bits encoded per sample, (i.e. either 3 or 4 are determined by the VBR circuitry).

Reference is now made to FIG. 5, which illustrates in greater detail the DSI-T circuitry 150 shown in FIG. 4. Time base circuitry 160 comprises conventional timing circuitry which is synchronized to a selected transmit clock output from timing circuitry 62 and is operative to provide various timing outputs required by the circuit elements of FIG. 2.

TSI switch 22, which has already been described in connection with FIG. 2, provides eight PCM bit streams to a serial delay memory 162 via a tri-state buffer 164. The serial delay memory 162 delays the inputs thereto by an amount determined by a delay counter 166 which is operative to provide a delay of either 21.875 msecs for digital bearers or a delay of 48 msecs for other bearers.

A delay enable/disable selector 168 receives both the delayed bit streams from memory 162 and the non-delayed bit streams directly from TSI switch 22 and is operative to select on a per-time slot basis, either the delayed or non-delayed signal.

A transmit trunk control memory 170 provides 8 bits of memory for each of the 256 trunk inputs. These inputs are written into the memory by main CPU 44 via a bi-directional bus. One bit per trunk is supplied to a serial-to-parallel converter 172 followed by a latch 174. The output of latch 174 provides the control to delay enable/disable selector 168.

Six other bits are supplied from control memory 170 to respective serial-to-parallel converters 176, 178, 180, 182, 184 and 186, followed by respective latches 188, 190, 192, 194, 196 and 198. The output from latch 188 is used to enable the speech detector 52 (FIG. 2) on a trunk by trunk basis. The output from latch 190 controls the SPD hangover time on a trunk to trunk basis. The output from latch 192 is used to enable the tone detector in circuit 52 on a trunk to trunk basis. The outputs of the remaining latches are held in reverse.

DSI switch 56 receives the output from delay enable/disable selector 168 and a random noise input from noise generator 59. The operation of DSI switch 56 is controlled by the main CPU 44 via a bi-directional bus in order to provide connections to the active trunks in accordance with demand as is taught in detail in the aforesaid U.S. Pat. 4,523,309.

Figure 6A:
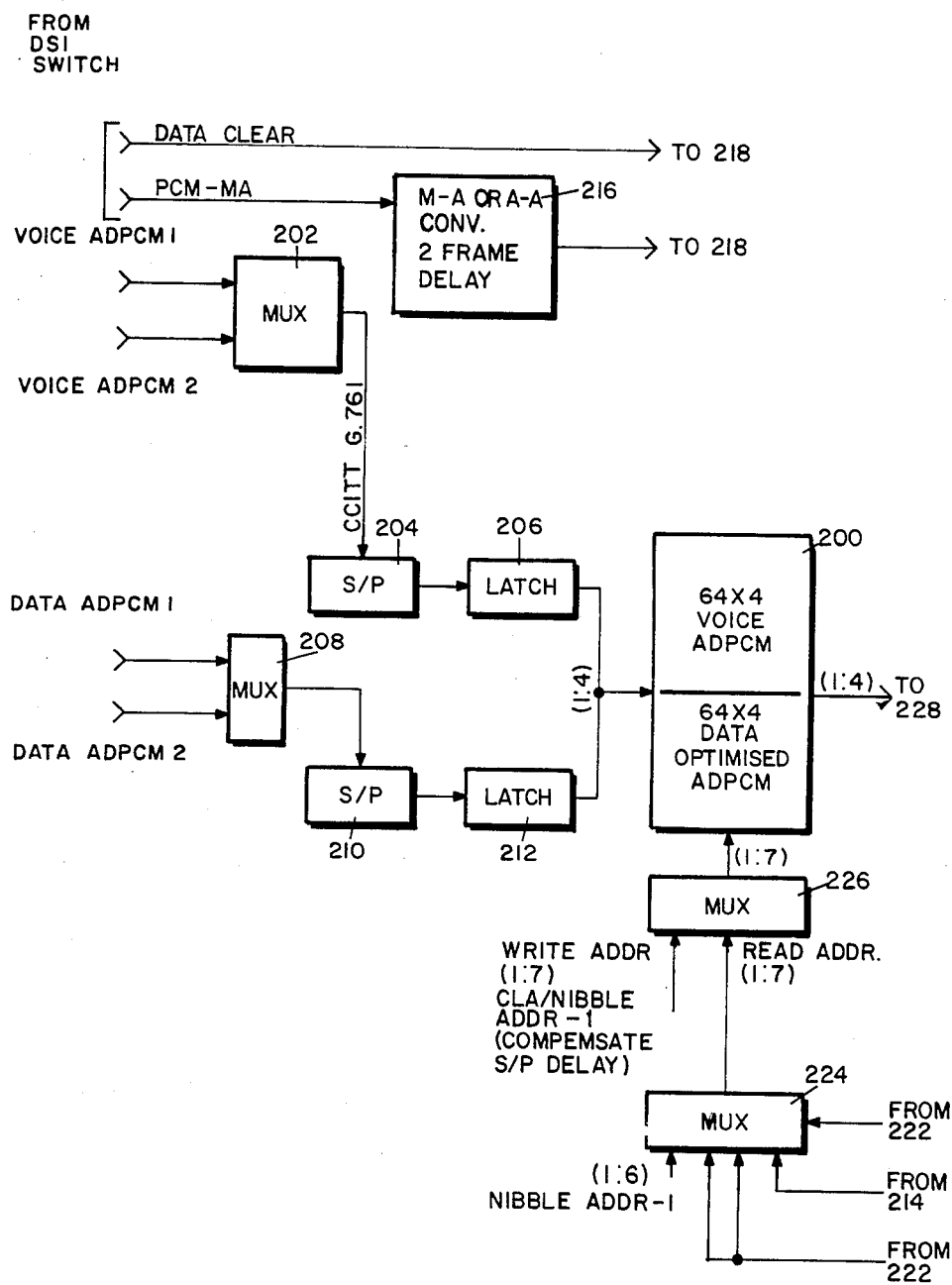
FIG. 6 is a block diagram illustration of part of the bearer output switch circuitry forming part of the apparatus of FIG. 2.
Figure 6B:
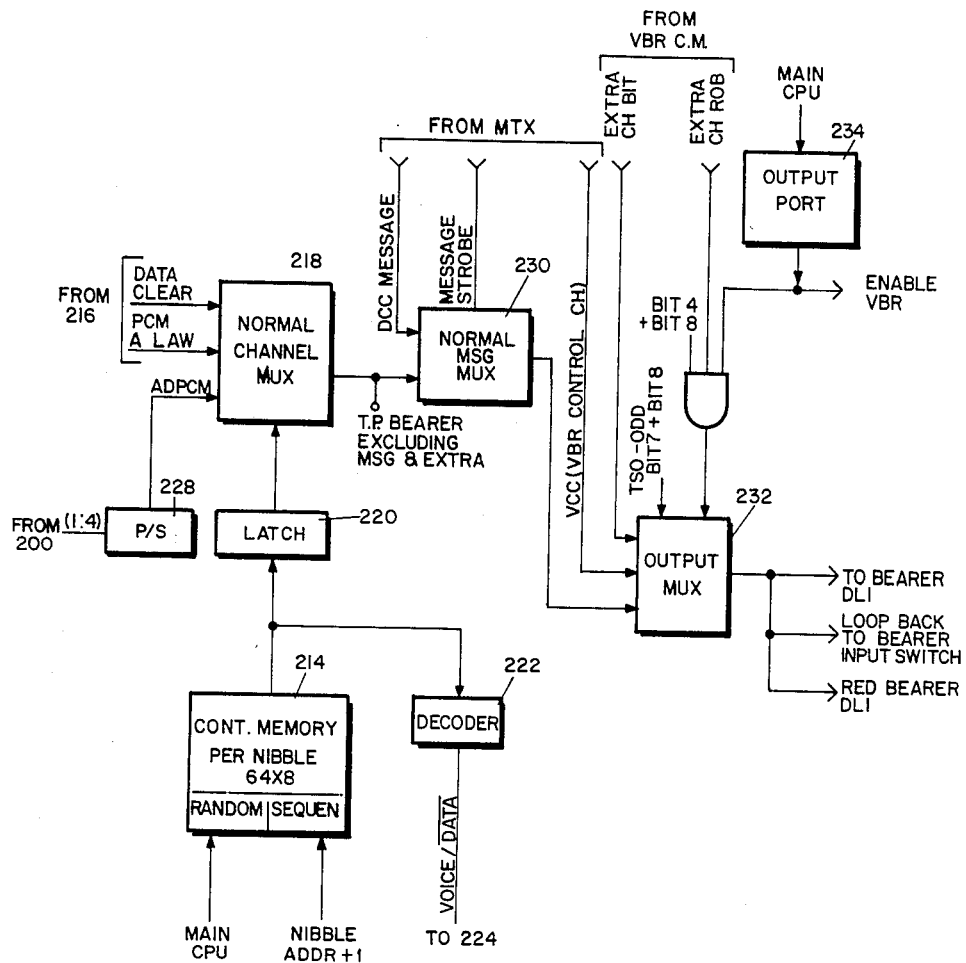
Figure 7A:
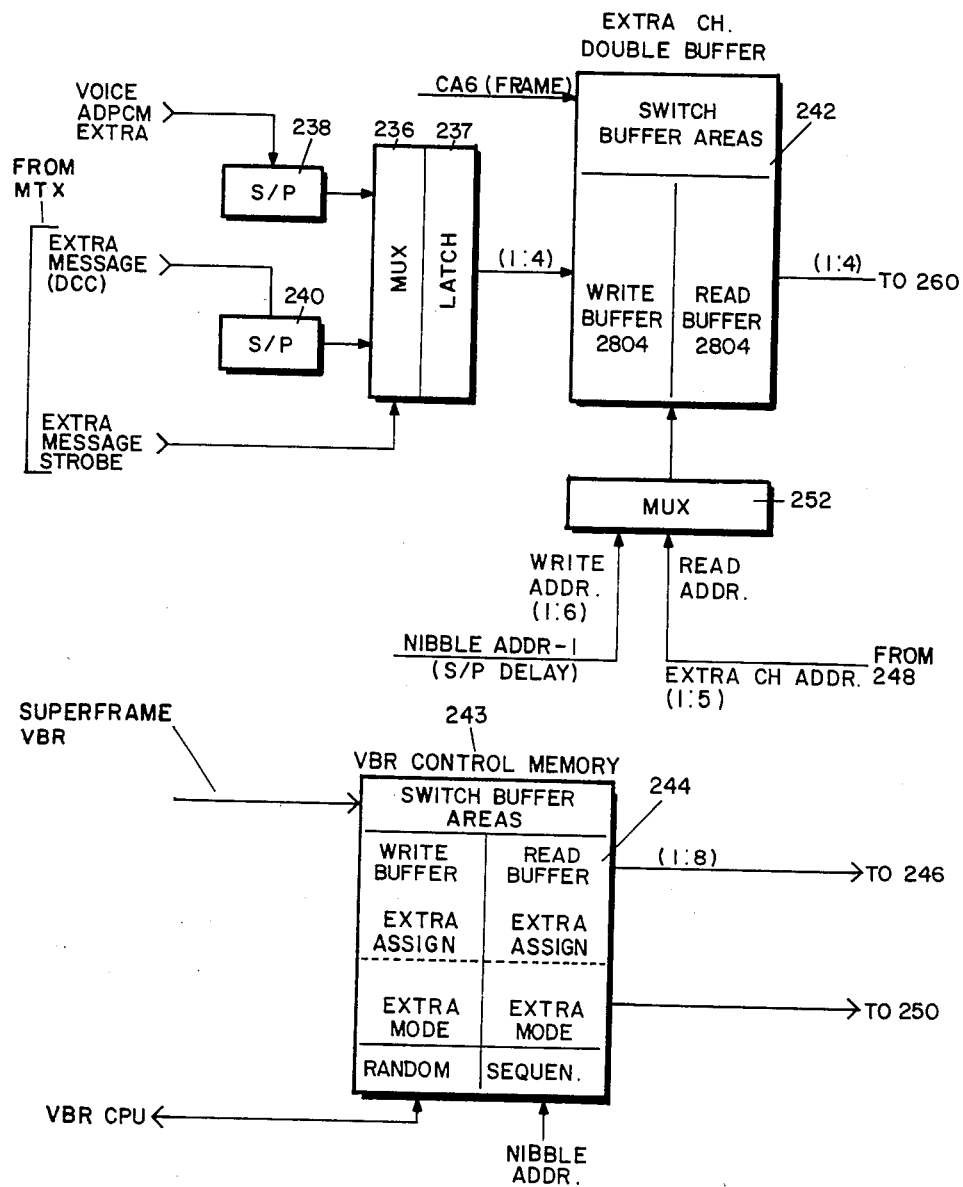
FIG. 7 is a block diagram illustration of another part of the bearer output switch circuitry forming part of the apparatus of FIG 2.
Figure 7B:
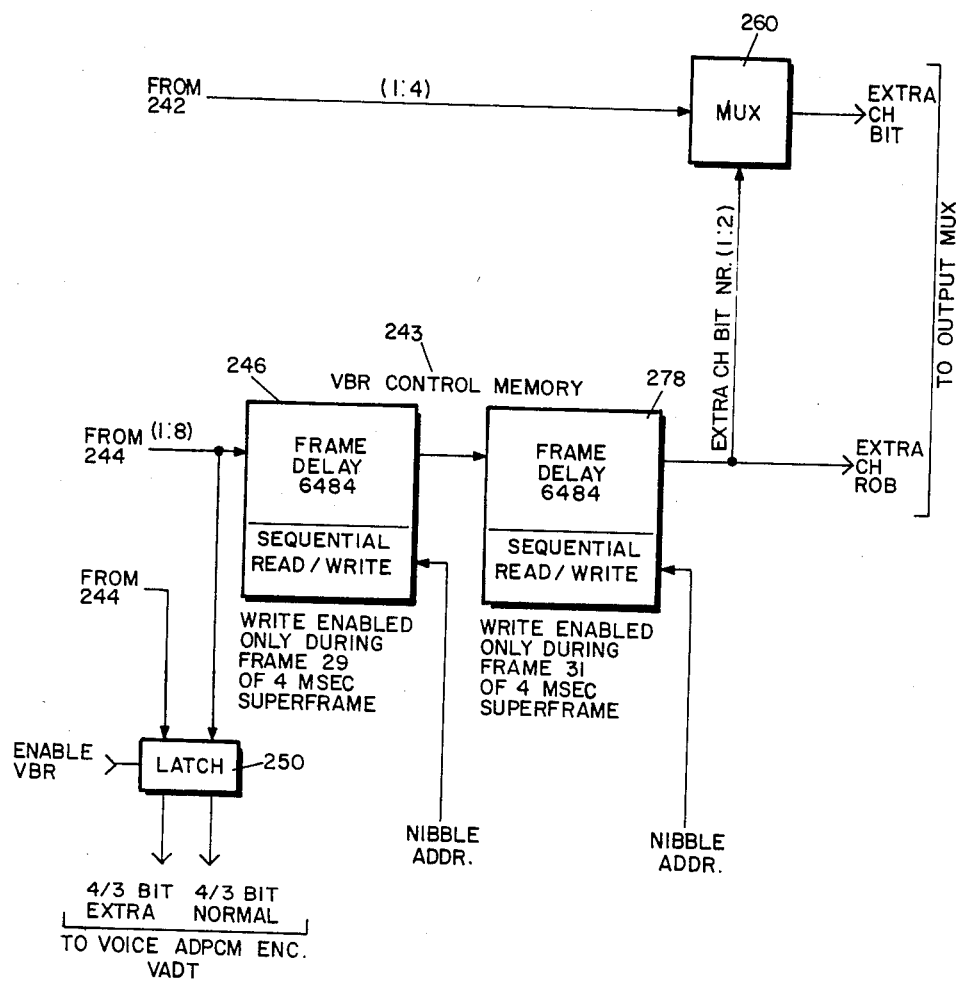

Reference is now made to FIGS. 6 and 7 which together provide a detailed illustration of BOS circuitry 158. Compressed signals provided by the ADPCM encoders 152 and 154 (FIG. 4) are written into an output buffer memory 200 via a multiplexer 202, a serial to parallel converter 204 and a latch 206.

The output buffer 200 comprises 64 memory locations of 4 bit capacity each for storing voice ADPCM samples of 62 normal channels. Two locations are not used. Another section of memory 200 is operative to store samples provided by voiceband data optimized ADPCM encoders 156 (FIG. 4). This section also comprises 64 memory locations of 4 bits capacity each. Thirty seven of the sixty-four memory locations are written in via a multiplexer 208, a serial-to-parallel converter 210 and a latch 212.

A control memory 214 comprises 64 memory locations each having 8 bits capacity and is operative to select for transmission from among the following:

A. Voice ADPCM samples from output buffer memory 200.
B. Voiceband data ADPCM samples from output buffer memory 200.
C. 8-bit sample signals for clear data transmission from DSI switch 56 (FIG. 5).
D. 8-bit sample signals received via a Mu-law—A-low converter 216 which includes the circuitry 72 shown in FIG. 2.

A multiplexer 218 is operative to select from among the above-listed inputs in response to control signals received from contrl memory 214 via a latch 220. The control memory 214 provides control signals to a decoder 222 and to a multiplexer 224. Decoder 222 detects control signals corresponding to either voice or voiceband data selection and provides suitable control signals to multiplexer 224.

Multiplexer 224 provides the read-out address to output buffer memory 200 via a multiplexer 226. Multiplexer 226 is operative to select between a sequential write address to output buffer memory 200 or a selective read address thereto. The selected read memory contents are provided via parallel-to-serial converter 228 to multiplexer 218.

The output of multiplexer 218 is supplied to a multiplexer 230 along with the DCC message generator 54, also indicated in FIG. 4 as MTX. Multiplexer 230 is operative to insert DCC messages into any of the bearer channels in accordance with the message strobe input provided by the MTX circuitry mentioned above.

An output multiplexer 232 is operative to insert into the bearer output bit stream VCC VBR control channel messages generated by sync transmitter 76 (FIG. 2), also indicated as part of MTX circuitry in FIG. 4, as well as extra channel bits provided by a multiplexer 260 forming part of the VBR circuitry. The VCC messages are inserted in bits 7 and 8 of every odd (non-framing) time slot 0 (TSO).

Extra channel bits may be inserted by multiplexer 232 into the bearer output bit stream at the least significant bits of each nibble, namely bits 4 and 8. The insertion occurs in response to receipt of an extra channel rob signal from a delay element 248 forming part of the VBR circuitry. An overall VBR operation enable is provided by the main CPU 44 via an output port 234.

A multiplexer 236 provides an input to a latch 237 and is operative to select either the output signal of extra voice ADPCM encoders which arrive via serial to parallel converter 238 or extra DCC messages from the MTX circuitry via a serial to parallel converter 240. The selected signal from latch 237 is sequentially written into an extra channel double buffer 242.

Buffer 242 comprises two substantially identical portions, each comprising 20 nibbles. At any given time, one of the two portions is operative for selecting reading, while the other is operative for sequential writing. The functions of the two portions are interchanged at the beginning of each frame.

A VBR control memory 243 comprises a double control buffer 244, control delay elements 246 and 248 and a latch 250. Double buffer 244 comprises two substantially identical portions whose functions are interchanged at the beginning of every VBR superframe, which comprises typically 32 PCM frames, and has a typical duration of 4 msecs.

At any given time one portion of the double buffer 244 is operative to control the VBR selection process while the other portion receives control instructions from the VBR CPU 74. At the beginning of each superframe, the functions of the two portions are interchanged.

Each portion of double buffer 244 comprises 64 memory locations corresponding to the 64 nibbles of the bearer output bit stream. The least significant bit of each bearer output bit stream may be allocated for transmittal of an extra channel bit. In such a case, the corresponding memory location in the double buffer 244 identifies the extra channel number and the bit number which is being transmitted.

Each portion of the double buffer 244 also comprises 64 memory locations, of which only 20 are used, corresponding to the 20 extra channels that may be provided by the VBR circuitry. Each memory location defines the number of bits allocated to each sample of each extra channel (3 bits or 4 bits).

The contents of one double buffer portion are read out during every frame via a latch 250 for indicating the output bit number to the voice ADPCM encoders 152 and 154.

The read out contents from double buffer 244 are delayed by delay elements 246 and 248, each of which provides a one-frame delay. The provision of this delay compensates for the processing time required by the ADPCM encoders and the extra channel double buffer 242 write operation such that the read operation from extra channel double buffer 242 coincides with presence therein of the signal resulting from the control outputs provided by buffer 244 via latch 250.

The output from delay element 248 is supplied to a multiplexer 252, to a multiplexer 260, and to multiplexer 232, which has already been described. Multiplexer 252 selects between a sequential write address and the selected read address and supplies the selected address to the extra channel double buffer 242. Multiplexer 260 selects one bit of the read out contents of the extra channel double buffer 242 for insertion thereof into the bearer output bit stream.

Figure 8A:
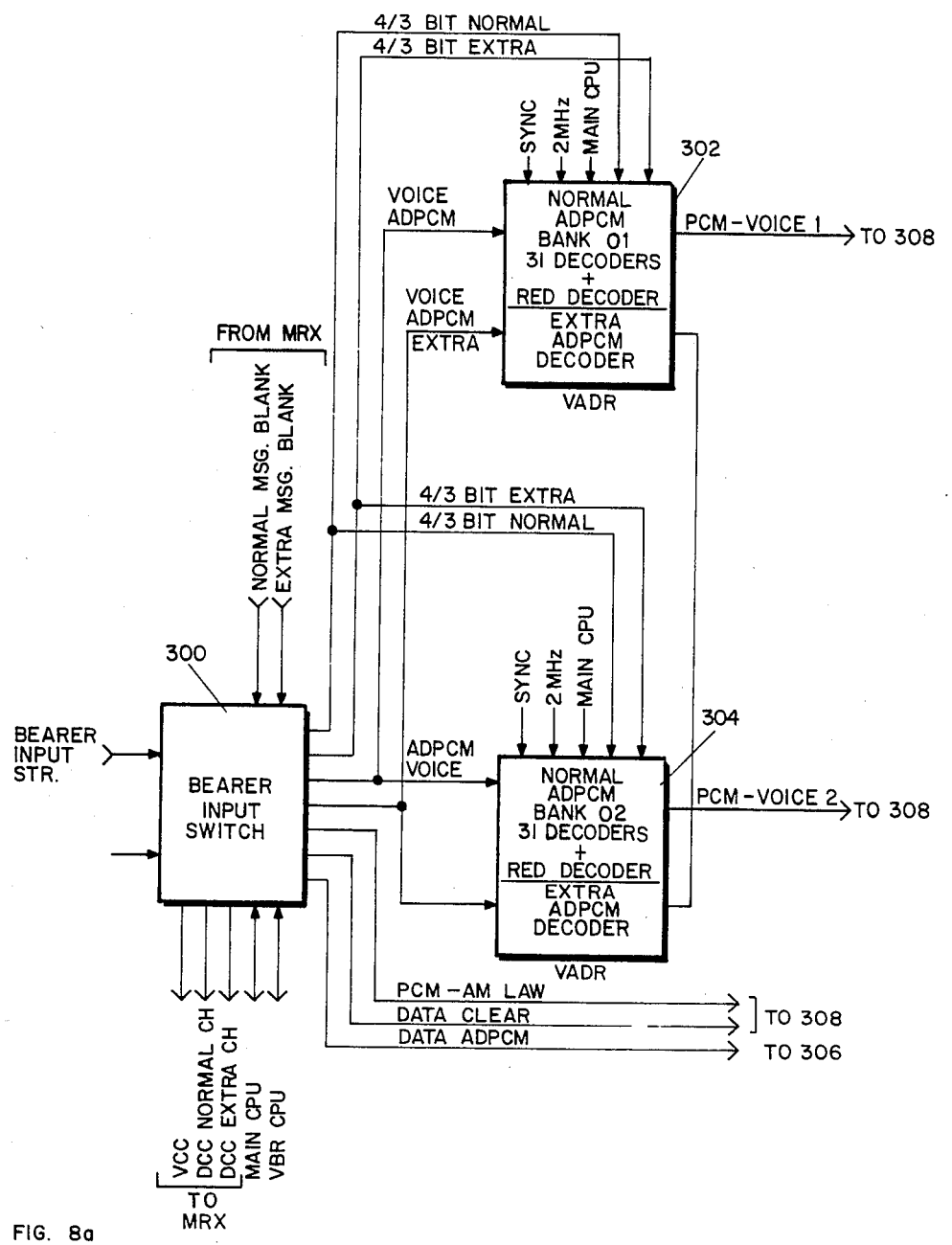
FIG. 8 is a block diagram illustration of the receive speech flow circuitry in the apparatus of FIG. 3.
Figure 8B:
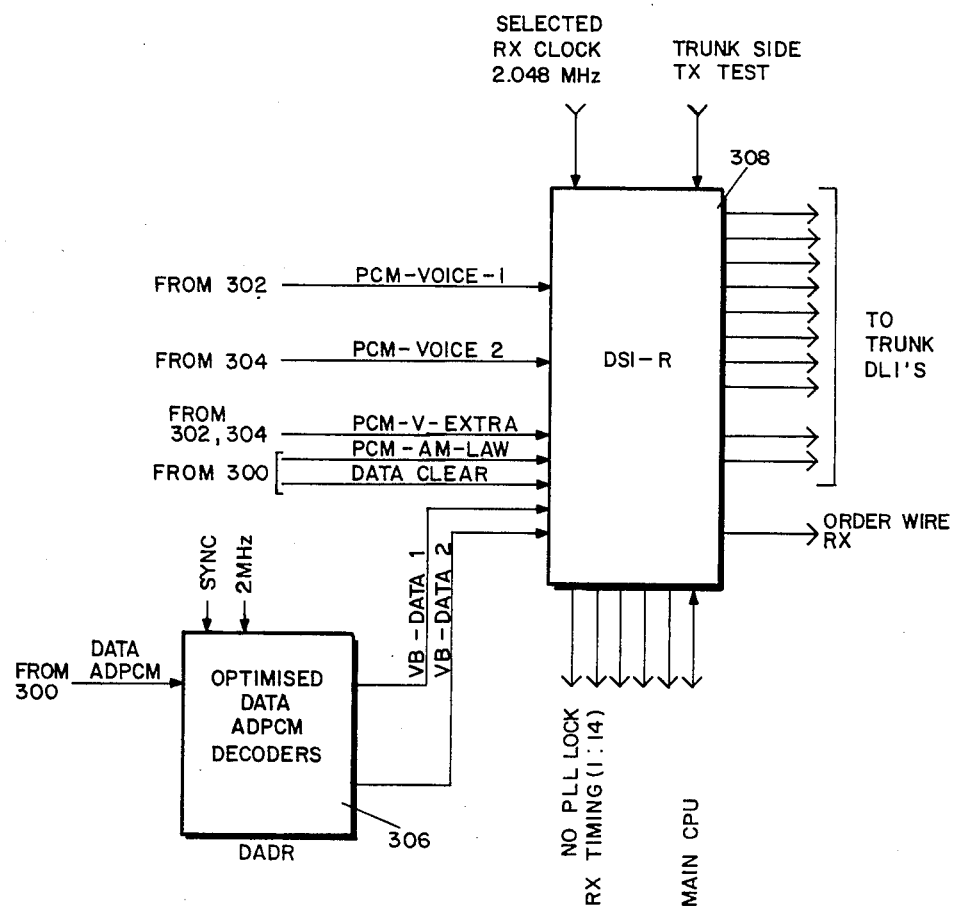

Reference is now made to FIG. 8, which is an interconnection diagram of the major components of the receive circuitry of FIG. 3. These components include bearer input switch circuitry (BIS) 300, voice ADPCM decoders 302 and 304, optimized voiceband data ADPCM decoders 306, and DSI-R circuitry 308.

BIS circuitry 300, which comprises VBR selector 86, receive delay and message blocking circuitry 90, buffer memory 96 and control memory 97, all shown in FIG. 3, receives an input from the BDLI interface 82 (FIG. 3) and also receives message blanking inputs from message receiver 94 in respect of both normal and extra channels.

BIS circuitry 300 provides the following outputs:
A. Two PCM bit streams which are supplied directly to DSI circuitry 308 for carrying signals in an 8-bit/-channel mode.
B. Two bit streams carrying compressed voice signals to normal and extra ADPCM decoders 302 and 304.
C. One bit stream carrying compressed voiceband data signals to optimized voiceband data decoders 306.
D. Control signals to normal and extra ADPCM decoders 302 and 304 for indicating whether signals are to be decoded according to 3- or 4-bit formats.
E. Three bits streams to the message receiver 94 and sync receiver 88 (FIG. 3) both indicated in FIG. 8 as MRX circuitry.

The main CPU 44 and the VBR CPU 74 each communicates with the BIS circuitry 300 via a separate bidirectional bus.

ADPCM decoder 302 and 304 also include redundant decoders which are switched into operation when needed by the main CPU 44 in response to sensed failure of an operating decoder.

DSI-R circuitry 308, which includes elements 95, 106, 112 and 120 of the DI and TSI circuitry shown in FIG. 3, receives the following inputs:
A. Two PCM bit streams, each of which is received from a respective ADPCM decoder 302, 304 for normal channels, i.e. not derived from operation of the VBR circuitry.
B. One PCM bit stream which is received from both ADPCM decoders 302 and 304 on the extra channels, i.e. those derived from operation of the VBR circuitry.
C. Two PCM bit streams which are received from optimized data ADPCM decoders 306 for carrying voice band data signals.
D. Two PCM bit streams which are received directly from bearer input switch circuitry (BIS) 300 for carrying signals in an 8-bit/channel mode.

The DSI-R circuitry 308 provides the following outputs:
A. Up to ten bit streams to TDLI cards 108.
B. One bit stream to order wire and test circuitry 122.
C. Various timing signals to circuit elements in the circuitry of FIG. 3.

The main CPU 44 communicates with the DSI-R circuitry 308 via a bidirectional bus.

Figure 9:
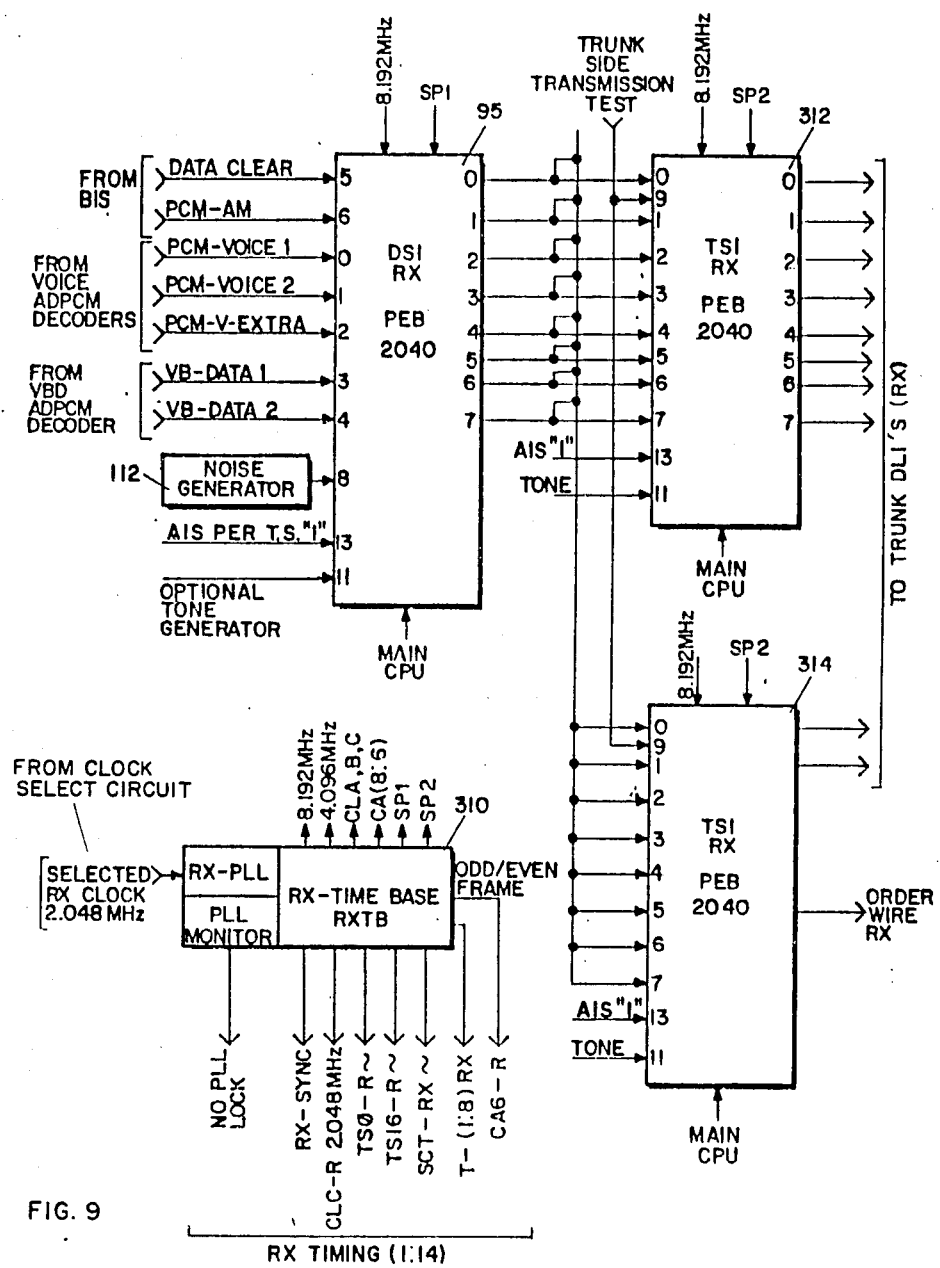
FIG. 9 is a block diagram illustration of the receive digital speech interpolation circuitry forming part of the apparatus of FIG. 3.

Reference is now made to FIG. 9 which illustrates in greater detail the DSI-R circuitry 308 shown in FIG. 8. Time base circuitry 310 comprises conventional timing circuitry which is synchronized to a selected receive clock output from timing circuitry 120 and is operative to provide various timing outputs required by the circuit elements of FIG. 3.

Receive DSI switch 95 and noise generator 112 have been described hereinabove with reference to FIG. 3. Receive TSI switch 106 (FIG. 3) comprises two switch elements 312 and 314. Switch element 312 provides outputs to the first eight TDLI cards 108, while switch element 314 provides outputs to two additional TDLI cards 108 and to the order wire and test circuitry 122.

Figure 10:
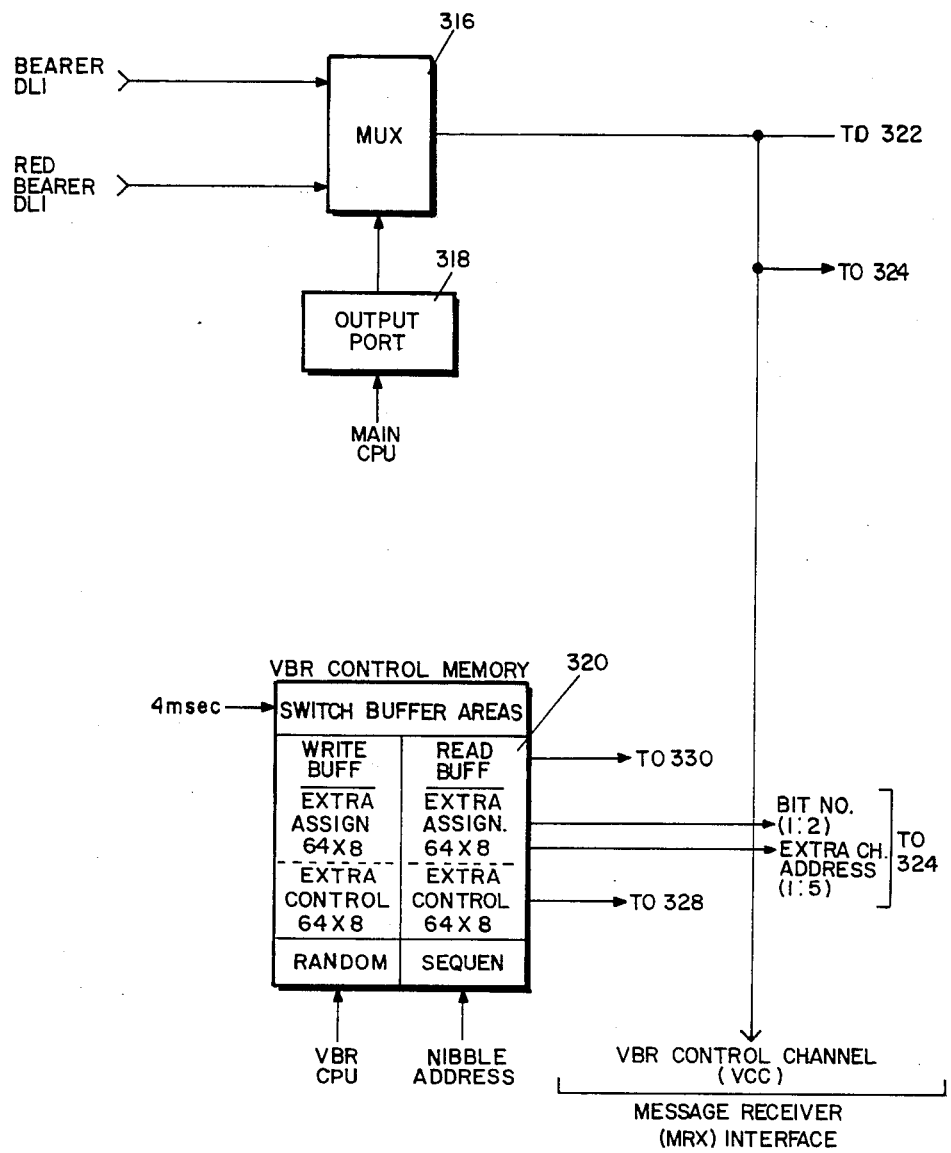
FIG. 10 is a block diagram illustration of part of the bearer input switch circuitry forming part of the apparatus of FIG. 3.
Figure 10B:
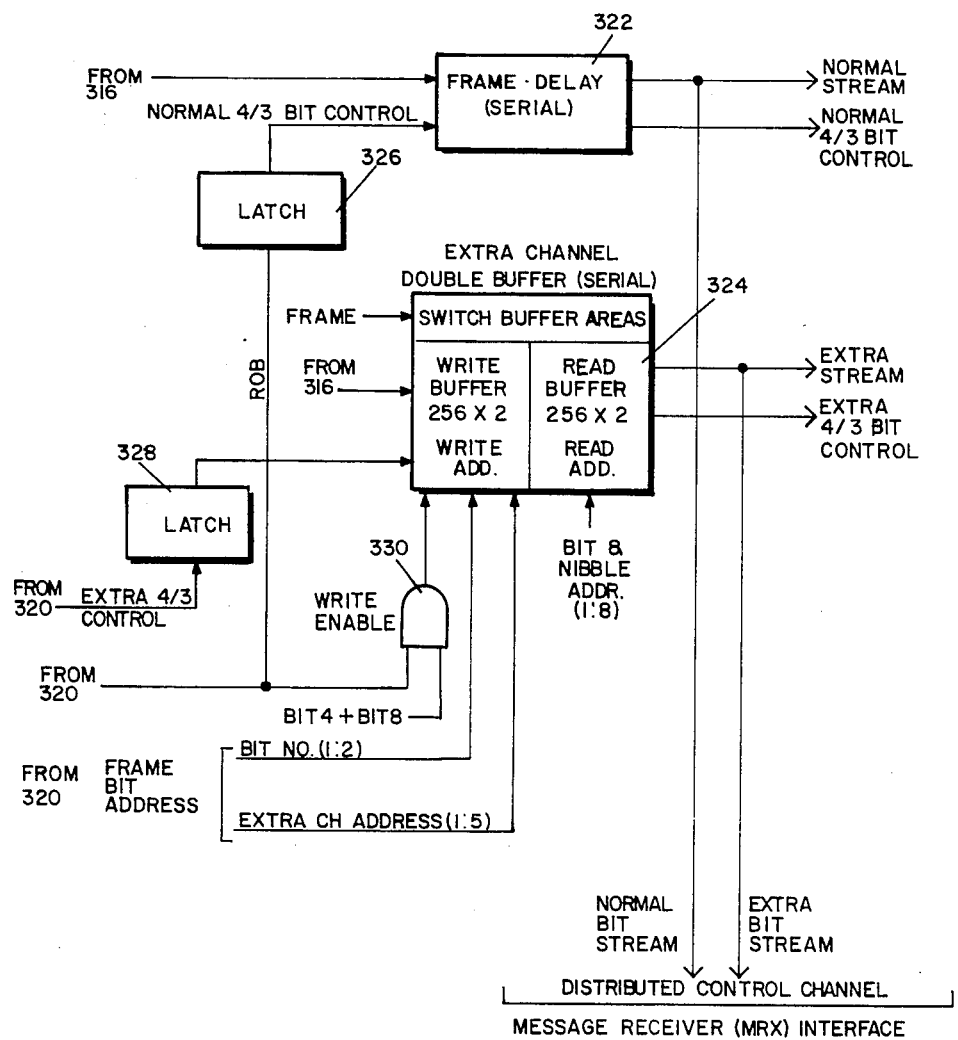
Figure 11A:
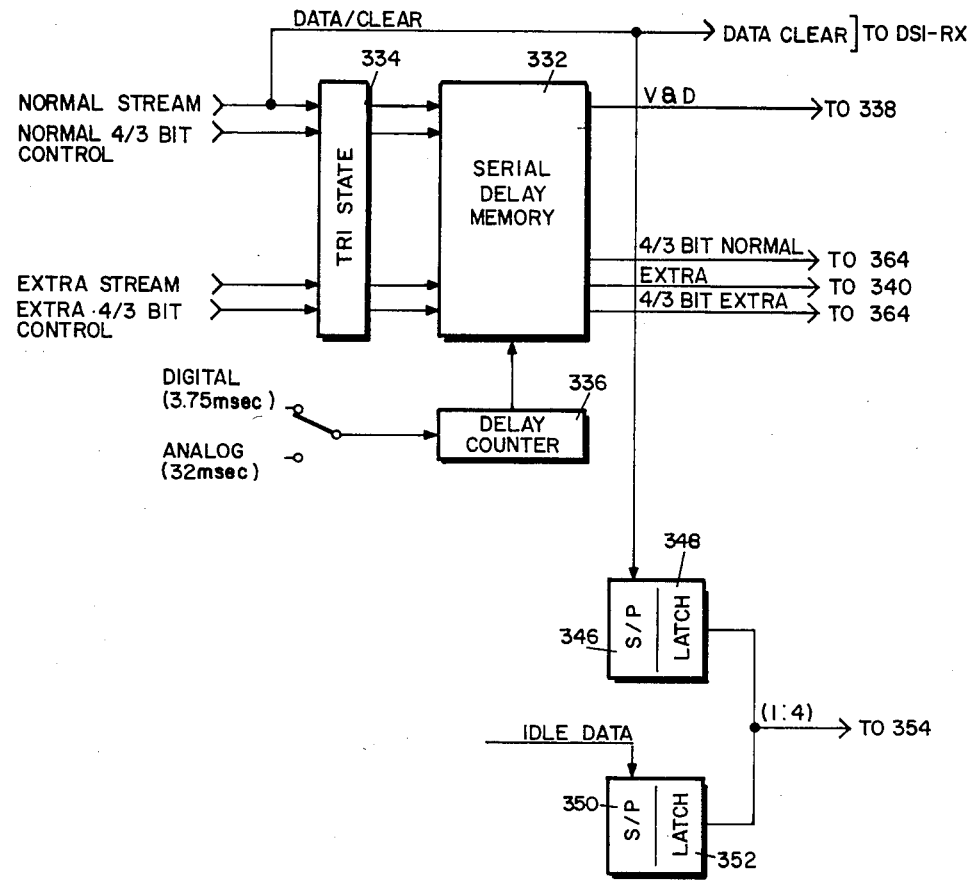
FIG. 11 is a block diagram illustration of another part of the bearer input switch circuitry forming part of the apparatus of FIG. 3.
Figure 11B:
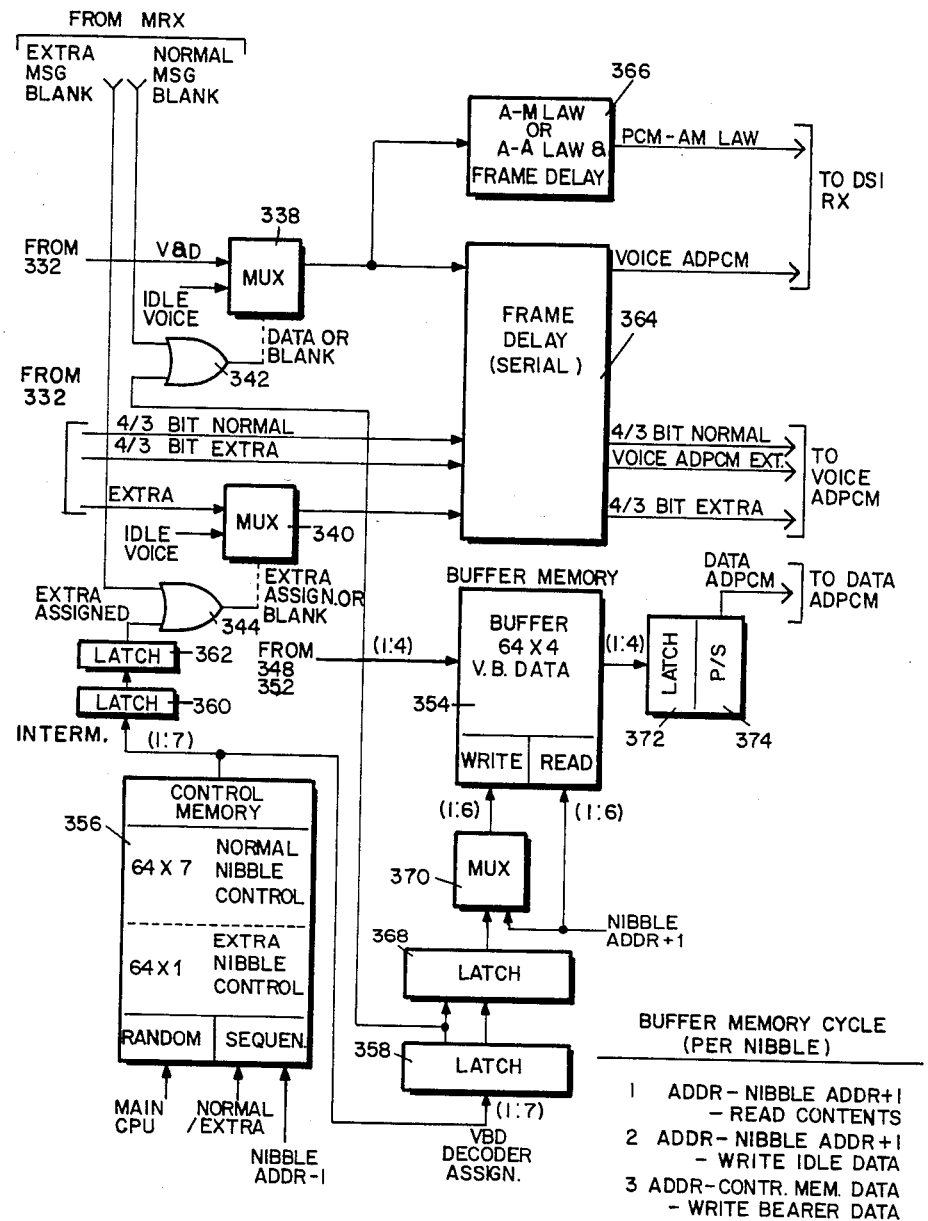

Reference is now made to FIGS. 10 and 11, which together provide a detailed illustration of BIS circuitry 300 (FIG. 8). The bearer bitstream input from the other end is supplied to the BIS circuitry 300 via BDLI interface 82 (FIG. 3) and is received at a multiplexer 316.

Multiplexer 316 is operative to select the bit stream received from a redundant BDLI interface when a BDLI interface failure is detected in accordance with commands received from the main CPU 44 via an output port 318.

A VBR control memory 320 is constructed as a double buffer and operates in a manner similar to the operation of the double buffer 244 in FIG. 7. At any given time, one portion of control memory 320 is operative to control the VBR selection while the other portion receives control instructions from VBR CPU 74. At the beginning of each superframe, typically of 4 msec duration, the functions of the two portions of VBR control memory 320 are interchanged.

Each portion of VBR control memory 320 comprises 64 memory locations corresponding to the 64 nibbles of the bearer output bit stream. The least significant bit of each bearer output bit stream may be allocated for receipt of an extra channel bit. In such a case, the corresponding memory location in the VBR control memory 320 identifies the extra channel number and the bit number which is being received.

Each portion of VBR control memory 320 also comprises an additional 64 memory locations of which only 20 are used, corresponding to 20 extra channels which may be provided by the VBR circuitry. Each additional memory location defines the number of bits allocated to each sample of each extra channel (3- or 4-bits). The contents of VBR control memory 320 are identical to those of double buffer 244 for any given frame transmitted under the control of double buffer 244 and received under the control of VBR control memory 320.

During every frame, the information received from multiplexer 316 is written in a delay element 322 and into an extra channel double buffer 324. Double buffer 324 comprises two substantially identical portions, each including 256 locations corresponding to each bit of the extra channel bit stream frame. At any given time, one of the two portions of buffer 324 is operative for selective writing, while the other is operative for sequential reading. The functions of the two portions are interchanged at the beginning of each frame.

The contents of one portion of double buffer 320 are read out during every frame into latches 326 and 328. Inter alia, they define the writing address for double buffer 324. The writing address for double buffer 324 indicates the extra channel number and the bit number within that extra channel to which a received bit is directed.

The output of latch 328 indicates the number of bits allocated to each sample of each extra channel. This output is written into extra channel double buffer 324 along with the signal sample bits of the corresponding extra channel. Therefore, sequential reading of the extra channel double buffer 324 provides two outputs: an extra channel bit stream along with a control bit stream which indicates the number of bits allocated to each extra channel (3- or 4-bits). The writing operation to extra channel double buffer 324 is enabled by an AND gate 330 only during bits 4 and 8 of each bearer bit stream time slot. These bits are the least significant bits of each bearer bit stream nibble and may carry extra channel bits.

The normal bearer channel information from multiplexer 316 along with the 3- or 4-bit control information from latch 326 are delayed in a one frame delay 322 in order to equalize the delay of the normal and extra channels.

The message receiver (MRX) 94 (FIG. 3) receives the following signals from the BIS circuitry 300:

A. A bit stream from multiplexer 316 for detection of VBR control channel messages by sync receiver 88 (FIG. 3).

B. A normal channels bit stream from delay element 322 for detection of distributed control channel messages on normal channels.

C. An extra channels bit stream from extra channel double buffer 324 for detection of distributed control channel messages on extra channels.

The normal and extra channel bit-streams are connected to a receive delay memory 332 along with a 4-/3-bit control bit stream for each of the signal bit streams (normal and extra) via a tristate buffer 334. The receive delay memory 332 is operative to delay the receive signals along with their respective 4-/3-bit control signal and to provide the time during which distributed control messages are detected. The duration of receive delay 332 is controlled by delay counter 336 and is typically 3.75 msec for the digital bearer and 32 msec for an optional analog bearer.

Multiplexers 338 and 340 are provided to blank control messages on normal and extra channels, respectively. The delayed normal bit stream is connected from delay memory 332 to multiplexer 338. When a message is detected on a normal channel, a control signal is sent from the MRX 94 to multiplexer 338 via an OR gate 342. This control signal causes multiplexer 338 to insert an idle voice pattern into the normal channel instead of the message bits.

In the same manner a message is blanked on an extra channel when the extra channel bit stream from delay memory 332 passes through multiplexer 340. When a message is detected on an extra channel, a control signal is sent from MRX 94 to multiplexer 340 via an OR gate 344. This control signal causes multiplexer 340 to insert an idle voice pattern into the extra voice channel instead of the message bits.

The normal bit stream from one frame delay element 322 is also connected directly to DSI-R circuitry 308 (FIG. 8) for clear channel reception and is connected also to a serial-to-parallel converter 346. The parallel output of serial-to-parallel converter 346 is supplied to the input of a buffer memory 354 via a latch 348. Buffer memory 354 is capable of storing 64 nibbles corresponding to 64 nibble time slots in the normal bearer bit stream.

Buffer memory 354 also receives an idle data input via a latch 352 from a serial to parallel converter 350. This input is written into all of buffer memory 354 when no voiceband data signals are received. When voiceband data signals are received on any of the normal channels, samples thereof are written into the corresponding nibble in buffer memory 354 via the serial to parallel converter 346 and latch 348.

A control memory 356 comprises 64 memory locations coresponding to the 64 nibbles of the bearer bit stream. Each location indicates whether the respective nibble carries voiceband signals and the number of the data optimized ADPCM decoder to which the voiceband data signal is to be connected.

Control memory 356 also comprises 64 additional memory locations of which only 20 are typically used. These 20 additional memory locations correspond to the 20 extra channels. Each memory location indicates whether the respective extra channel is used.

During every frame, the control information is read out from control memory 356 into latches 358 and 360. The output of latch 358 controls multiplexer 338 via an OR gate 342 to insert an idle voice pattern to a respective voice PSDPCM decoder when the corresponding nibble carries voiceband data signals rather than voice signals.

The output of latch 360 is delayed by a latch 362 and then controls multiplexer 340 via an OR gate 344 to insert an idle voice pattern to any extra ADPCM decoder which is not currently being used.

The normal bit stream from multiplexer 338 and the extra bit stream from multiplexer 340 are connected to a delay element 366, each bit stream being accompanied by its 3- or 4-bit control bit stream. The outputs of delay element 366 are fed to voice ADPCM decoders 302 and 304 (FIG. 8). The output of multiplexer 338 is also supplied to an A-law to mu-law converter 366 for eight bit PCM transmission. The output of A-law to mu-law converter 366 is connected to DSI-R circuitry 308 (FIG. 8).

The output of latch 358 is coupled to the write address input of buffer memory 354. Therefore the bearer input nibbles carrying voiceband data signals are written into the buffer memory 354 at locations identified by the control memory 356. The contents of buffer memory 354 are read sequentially into a latch 372 and are then converted into a serial bit stream by a parallel to serial converter 374. The serial bit stream carries voiceband data signals to data optimized ADPCM decoders 306 (FIG. 8).

Figure 12:
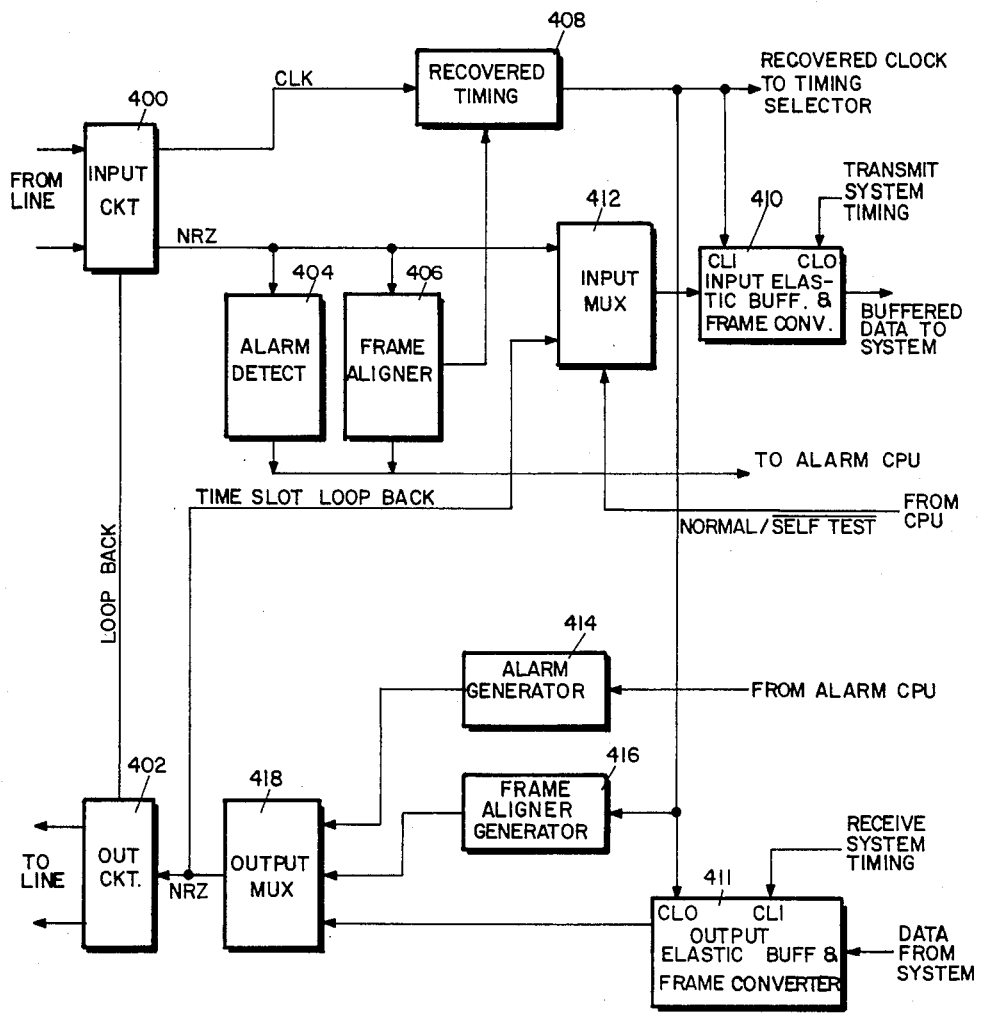
FIG. 12 is a block diagram illustration of a DLI card employed in the apparatus of FIGS. 2 and 3.

Reference is now made to FIG. 12, which illustrates the configuration of digital line interface cards which are employed in the apparatus of the present invention (at reference numerals 40 and 78 in FIG. 2 and at reference numerals 82 and 108 in FIG. 3).

Two types of digital line interface (DLI) cards are employed in the apparatus of the present invention:

A. 1.544 Mbps interface compatible.

B. 2.048 Mbps interface compatible.

Both of these types employ the functional blocks illustrated in FIG. 12 and described hereinbelow. An input circuitry 400 provides conversion from a bipolar input such as HDB3 (coded for 2.048 Mbps standard) to a TTL level NRZ signal of incoming data and recovered clock. An output circuitry 402 converts the NRZ format of the outgoing formatted data on the line bipolar signal to comply with required pulse shape and other characteristics.

A loop back connection may be provided from the output circuit 402 to the input circuit 400 for maintenance purposes. An interface loopback condition loops the bipolar output signal to the bipolar input by means of relays. In this case the input line is properly terminated and an all "1"s signal (AIS) is driven to the output line.

An alarm detect circuit 404 provides detection of incoming alarms (remote alarms) and bad line conditions (excessive bit error rate). The output of this circuit updates the Alarms CPU (110 FIG. 3) with each line condition. Frame aligner circuitry 406 provides frame synchronization of the interface to incoming signals. A recovered timing circuit 408 is present according to the output of aligner circuit 406. An indication out of frame condition is fed to Alarms CPU 110.

A recovered timing circuit 408 provides all the timing pulses needed for the input units. By means of a local PLL, higher frequency clocks are generated, providing rate conversion in the 1.544 Mbps type and memory control for input and output elastic buffers 410 and 411. An input multiplexer 412 enables the selection of incoming data during normal operation or looped back data during self test operation for supply to the input elastic buffer 410. This selection is performed on a per time slot basis.

The input elastic buffer and frame converter 410 provides the following functions:
1. Plesiochronous buffering between incoming data and system timing at the trunk side.
2. Frame synchronization between all incoming bit streams.
3. Frame conversion for the 1.544 Mbps type and different rate buffering.

The output elastic buffer and frame converter 411 performs functions similar to those of the input elastic buffer and frame converter 410 between outgoing signals and system timing.

An alarm generator 414 is controlled by the Alarms CPU 110 and generates output alarm codes initiated by other elements of the circuitry described herein.

A frame aligner generator 416 provides frame alignment signals to be multiplexed with information signals on the output signal. An output multiplexer 418 combines all controlled signals into one outgoing bit stream. The NRZ information is provided to the output circuit 402.

Reference is now made to FIGS. 13-16, the figures are detailed and therefore with a view towards conciseness they are not described again in the text.

FIG. 13 is a block diagram illustration of a distributed control channel message transmitter (message generator 54) employed in FIG. 2.

FIG. 14 is a block diagram illustration of a VBR control channel message transmitter (sync transmitter 74) employed in FIG. 2.

FIG. 15 is a block diagram illustration of a distributed control channel message receiver (message generator 94) employed in FIG. 3.

FIG. 16 is a block diagram illustration of a VBR control channel message receiver (sync receiver 88) employed in FIG. 3.

It will be appreciated by persons skilled in the art that the present invention is not limited to what has been particularly shown and described hereinabove. Rather the scope of the invention is defined only by the claims which follow.

We claim:

1. A digital circuit multiplication system for interconnecting a transmission trunk link having a plurality of communication channels to a second plurality of telephone communication trunks, said communication channels being transmitted via a bearer bit stream, the second plurality exceeding the first plurality, and comprising:
    transmission apparatus at a first end of the transmission trunk link including means for detecting signals on said second plurality of telephone communication trunks and means for assigning each telephone communication line on which signals are present to an available one of the first plurality of communication channels and for providing assignment messages indicating such assignments;
    adaptive differential pulse code modulation transmitting means operative to be coupled to said first plurality of communications channels and to transmit speech signals in bit reduced form;
    combining means for receiving the output of adaptive differential pulse code modulation transmitting means and combining said output with said assignment messages along the first plurality of communications channels;
    signal receiving and message detection means at a second end of the transmission trunk link and being operative to receive the speech signals and assignment messages transmitted via said combining means and to strip the assignment messages therefrom; and
    receiving apparatus coupled to said signal receiving and message detection means including means for receiving said assignment messages and assigning each of the first plurality of communication channels carrying signals to a corresponding one of said second plurality of telephone communication lines in accordance with assignment information received from said transmission apparatus.

2. A digital circuit multiplication system for interconnecting a transmission trunk line having a plurality of communication channels to a second plurality of telephone communication trunks, said communication channels being transmitted via a bearer bit stream, the second plurality exceeding the first plurality, and comprising:
    transmission apparatus at a first end of the transmission trunk link including means for detecting signals on said second plurality of telephone communication trunks and means for assigning each telephone communication line on which signals are present to an available one of the first plurality of communication channels and for providing assignment messages indicating such assignments;
    adaptive differential pulse code modulation transmitting means operative to be coupled to said first plurality of communications channels and to transmit speech signals in bit reduced form;
    combining means for receiving the output of said adaptive differential pulse code modulation transmitting means and combining said output with said assignment messages along the first plurality of communications channels;
    signal receiving and message detection means at a second end of the transmission trunk line and being operative to receive the speech signals and assignment messages transmitted via said combining means and to strip the assignment messages therefrom; and
    receiving appratus coupled to said signal receiving and message detection means including means for receiving said assignment messages and assigning each of the first plurality of communications channels carrying signals to a corresponding one of said second plurality of telephone communication lines in accordance with assignment information received from said transmission apparatus,
    wherein said signal receiving and message detection means comprises:

receive delay circuitry for temporarily storing the signals received from the adaptive differential pulse code modulation transmitting means;

message receiver means for detecting assignment messages contained in the received signals; and message extractor means for receiving the delayed output of the receive delay circuitry and for providing output signals wherein the assignment messages are not present and are replaced by a predetermined signal pattern.

3. A system according to claim 2 and wherein said predetermined signal pattern correspond to typical signals indicating the absence or near absence of speech.

4. A system according to claim 2 and wherein said signal receiving and message detection means also comprises quantizing means and predictor means and wherein said predetermined signal pattern is configured so as to appear to the quantizing means and predictor means as if ordinary signals indicating the absence or near absence of speech were present.

5. A system according to claim 3 and wherein said signal receiving and message detection means also comprises quantizing means and predictor means and wherein said predetermined signal pattern is configured so as to appear to the quantizing means and predictor means as if ordinary signals indicating the absence or near absence of speech were present.

6. A system according to claim 1 and wherein said assignment messages include a first number of bits containing assignment information and a second number of bits, exceeding said first number of bits devoted to identification code information.

7. A system according to claim 2 and wherein said assignment messages include a first number of bits containing assignment information and a second number of bits, exceeding said first number of bits devoted to identification code information.

8. A system according to claim 3 and wherein said assignment messages include a first number of bits containing assignment information and a second number of bits, exceeding said first number of bits devoted to identification code information.

9. A system according to claim 1 and wherein said assignment messages include a first number of bits containing assignment information and a second number of bits, substantially exceeding said first number of bits devoted to identification code information.

10. A system according to claim 2 and wherein said assignment messages include a first number of bits containing assignment information and a second number of bits, substantially exceeding said first number of bits devoted to identification code information.

11. A system according to claim 3 and wherein said assignment messages include a first number of bits containing assignment information and a second number of bits, substantially exceeding said first number of bits devoted to identification code information.

12. A system according to claim 1 and also comprising variable bit rate means operative under overload conditions to assign a lesser number of bits to speech signal samples than the usual number of bits assigned thereto under non-overload conditions.

13. A system according to claim 2 and also comprising variable bit rate means operative under overload conditions to assign a lesser number of bits to speech signal samples than the usual number of bits assigned thereto under non-overload conditions.

14. A system according to claim 3 and also comprising variable bit rate means operative under overload conditions to assign a lesser number of bits to speech signal samples than the usual number of bits assigned thereto under non-overload conditions.

15. A system according to claim 12 and wherein said variable bit rate means is operative under overload conditions to assign the least significant bits of nibbles in a bearer bit stream to an additional speech signal sample, whereby the positions of the samples in the bit stream remain stable even when each channel is assigned a variable number of bits.

16. A system according to claim 1 and also including means for transmitting distributed control messages along the three most significant bits of nibbles in a bearer bit stream transmitted along said transmission trunk link.

17. A system according to claim 2 and also including means for transmitting distributed control messages along the three most significant bits of nibbles in a bearer bit stream transmitted along said transmission trunk link.

18. A system according to claim 3 and also including means for transmitting distributed control messages along the three most significant bits of nibbles in a bearer bit stream transmitted along said transmission trunk link.

* * * * *